United States Patent
Quint et al.

(10) Patent No.: US 12,085,402 B2
(45) Date of Patent: Sep. 10, 2024

(54) OFF-ROAD ACTIVITY TRACKER

(71) Applicant: Rivian IP Holdings, LLC, Plymouth, MI (US)

(72) Inventors: Jason Meyer Quint, Ann Arbor, MI (US); Kok Wei Koh, Mountain View, CA (US); Brennan Boblett, Orinda, CA (US); Samuel Morgan Roberts, Santa Cruz, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 87 days.

(21) Appl. No.: 17/384,954

(22) Filed: Jul. 26, 2021

(65) Prior Publication Data

US 2023/0029321 A1 Jan. 26, 2023

(51) Int. Cl.
| | | |
|---|---|---|
| G01C 21/36 | (2006.01) | |
| G01C 21/00 | (2006.01) | |
| G06F 16/29 | (2019.01) | |
| G06V 20/56 | (2022.01) | |

(52) U.S. Cl.
CPC ...... *G01C 21/3626* (2013.01); *G01C 21/3811* (2020.08); *G01C 21/3815* (2020.08); *G06F 16/29* (2019.01); *G06V 20/588* (2022.01)

(58) Field of Classification Search
CPC ... G06F 16/29; G06V 20/588; G01C 21/3811; G01C 21/3815; G01C 21/3626; G01C 21/3679; G01C 21/3826; B60W 50/14; B60W 2050/146; B60W 2300/185
See application file for complete search history.

(56) References Cited

U.S. PATENT DOCUMENTS

| | | | |
|---|---|---|---|
| 6,356,837 B1* | 3/2002 | Yokota | |
| 6,385,534 B1* | 5/2002 | Yoshimura | G01C 21/30 340/995.22 |
| 8,682,575 B2* | 3/2014 | Sakashita | |
| 2005/0038595 A1* | 2/2005 | Yokota | G01C 21/26 701/454 |
| 2015/0116135 A1* | 4/2015 | Sobue | G08G 1/0969 340/995.12 |
| 2018/0045531 A1* | 2/2018 | Davidson | |

FOREIGN PATENT DOCUMENTS

JP 4896460 B2 * 3/2012

OTHER PUBLICATIONS

JP-4896460-B2 English Translation (Year: 2012).*

\* cited by examiner

*Primary Examiner* — Anne Marie Antonucci
*Assistant Examiner* — Connor L Knight
(74) *Attorney, Agent, or Firm* — Patterson + Sheridan, LLP

(57) ABSTRACT

Disclosed embodiments include systems, vehicles, and methods for tracking off-road travel. In an illustrative embodiment, a system includes a computing device having computer-readable media storing computer-executable instructions configured to cause the computing device to monitor a vehicle location. The vehicle location is identified on map data for an area encompassing the location and including road data for recognized roads in the area. Off-road travel is detected in response to determining that the vehicle location is outside of the recognized roads. Travel data is recorded representing the off-road travel of the vehicle.

20 Claims, 22 Drawing Sheets

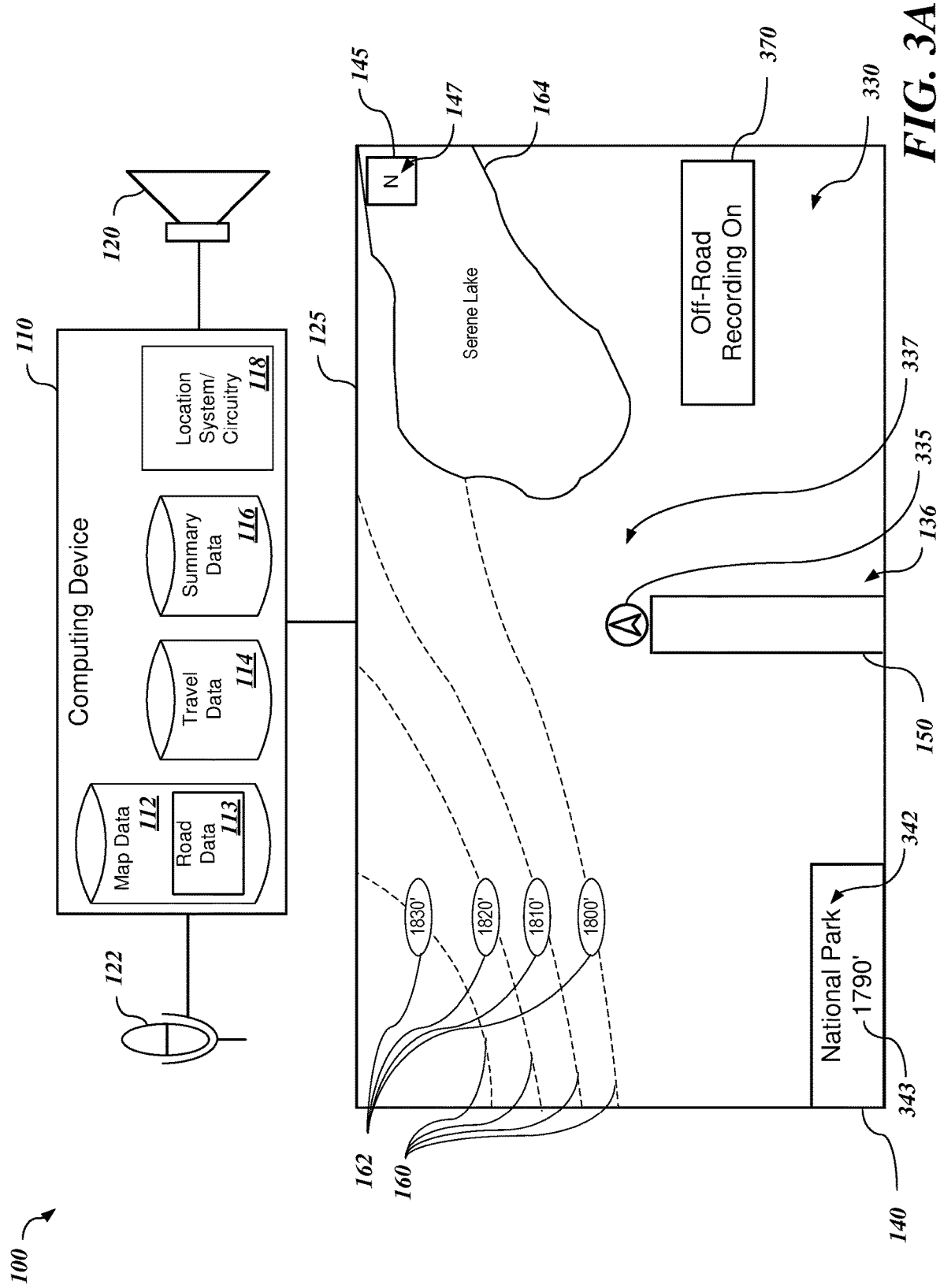

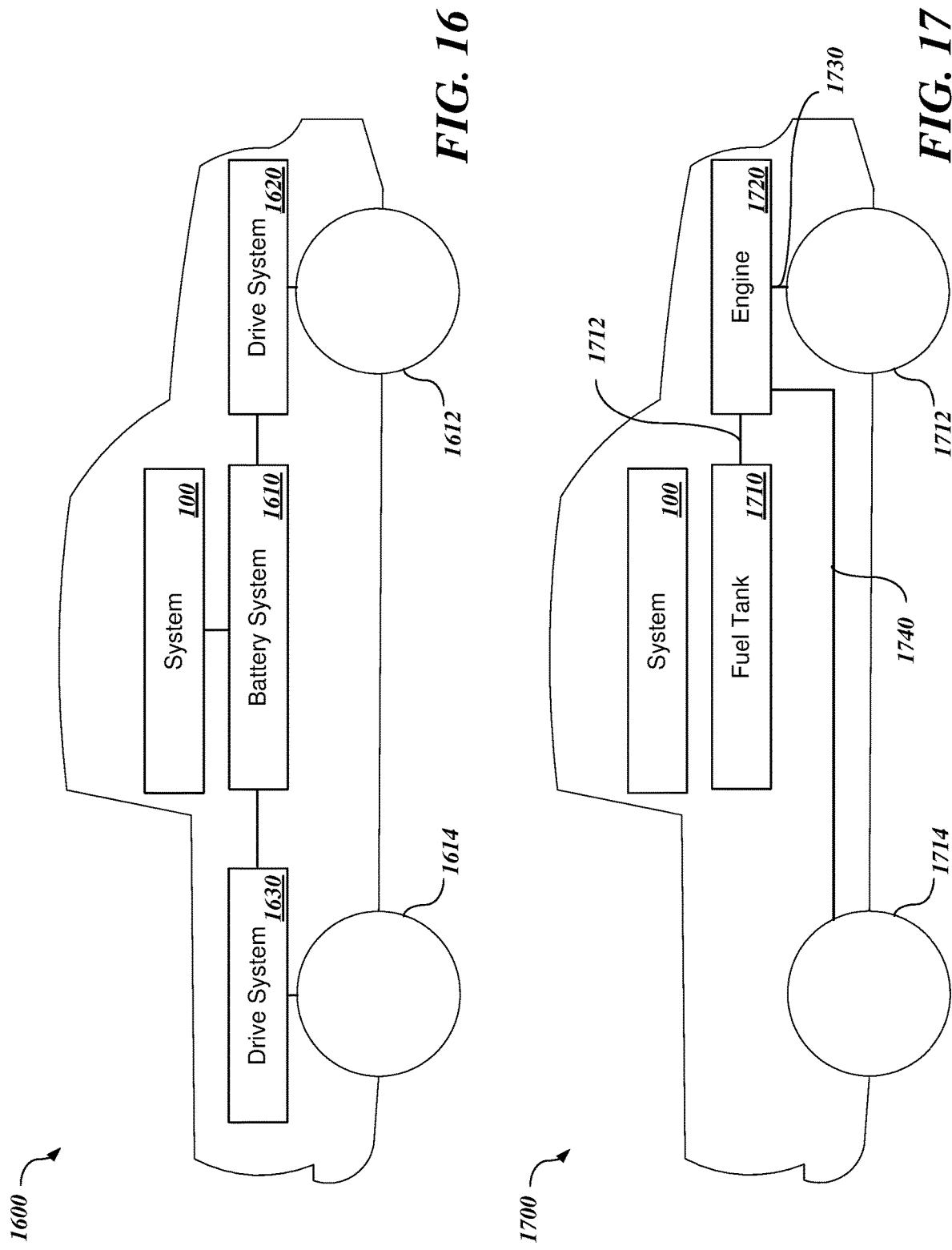

OFF-ROAD ACTIVITY TRACKER

INTRODUCTION

Navigational systems, such as handheld systems or systems integrated into vehicles, provide navigational assistance in reaching a selected destination. Many navigational systems also enable users to perform other functions, such as estimating a distance or time to a destination, determining latitude and longitude, locating service establishments, such as gas stations, restaurants, or hospitals, and other functions. Most navigational systems, particularly those integrated into vehicles, include a database of roadways that are used to plot routes to a destination and/or estimate distance and time to a destination.

SUMMARY

Disclosed embodiments include systems, vehicles, and methods for tracking off-road travel.

In an illustrative embodiment, a system includes a computing device having computer-readable media storing computer-executable instructions configured to cause the computing device to monitor a vehicle location. The vehicle location is identified on map data for an area encompassing the location and including road data for recognized roads in the area. Off-road travel is detected in response to determining that the vehicle location is outside of the recognized roads. Travel data is recorded representing the off-road travel of the vehicle.

In another illustrative embodiment, a vehicle includes a drive system, a location tracking device configured to determine a vehicle location and to generate location data, and a computing device having computer-readable media storing computer-executable instructions configured to cause the computing device to receive and monitor data representing the location. The location is identified on map data for an area encompassing the location and including road data for recognized roads in the area. Off-road travel of the vehicle is detected in response to determining that the vehicle location is outside of the recognized roads. Travel data is recorded representing the off-road travel of the vehicle. A location map is generated representing the location and the map data around the location.

In another illustrative embodiment, in an illustrative computer-implemented method, a vehicle location is monitored. The vehicle location identified on map data for an area encompassing the vehicle location and including road data for recognized roads in the area. Off-road travel of the vehicle is detected in response to determining that the vehicle location is outside of the recognized roads. Travel data is recorded representing the off-road travel of the vehicle. A location map is generated representing the vehicle location and the map data around the location.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings:

FIGS. 16 and 17 are block diagrams in partial schematic form of an electrically-powered vehicle and an internal combustion engine-powered vehicle, respectively that may be equipped with the system of FIGS. 1-14;

DETAILED DESCRIPTION

The following description explains, by way of illustration only and not of limitation, various embodiments.

By way of a non-limiting introduction and overview, in various embodiments a system (which may be integrated with a vehicle) is configured to monitor a vehicle location. In various embodiments the location identified on map data for an area encompassing the vehicle location and including road data for recognized roads in the area. In various embodiments and in response to determining that the vehicle location is outside of the recognized roads, off-road travel is detected and travel data is recorded representing the off-road travel of the vehicle. In some embodiments and as will be described below, the travel data may include positional coordinates, an elevation, a vehicle orientation, a time, and an area name for locations included in the off-road travel. Summary data for the off-road travel, such as a starting location of the off-road travel, an ending location of the off-road travel, a distance traveled during the off-road travel, a change in elevation from a beginning of the off-road travel to an end of the off-road travel, a date of the off-road travel, a beginning time of the off-road travel, an end time of the off-road travel, and a duration of the off-road travel, also may be recorded. In some embodiments the recorded travel data and/or summary data may be subsequently retrieved for later consideration of the off-road travel and/or to guide a traveler in later repeating the off-road travel.

Now that a general overview has been given, details of various embodiments will be explained by way of non-limiting examples given by way of illustration only and not of limitation.

Figure 1:
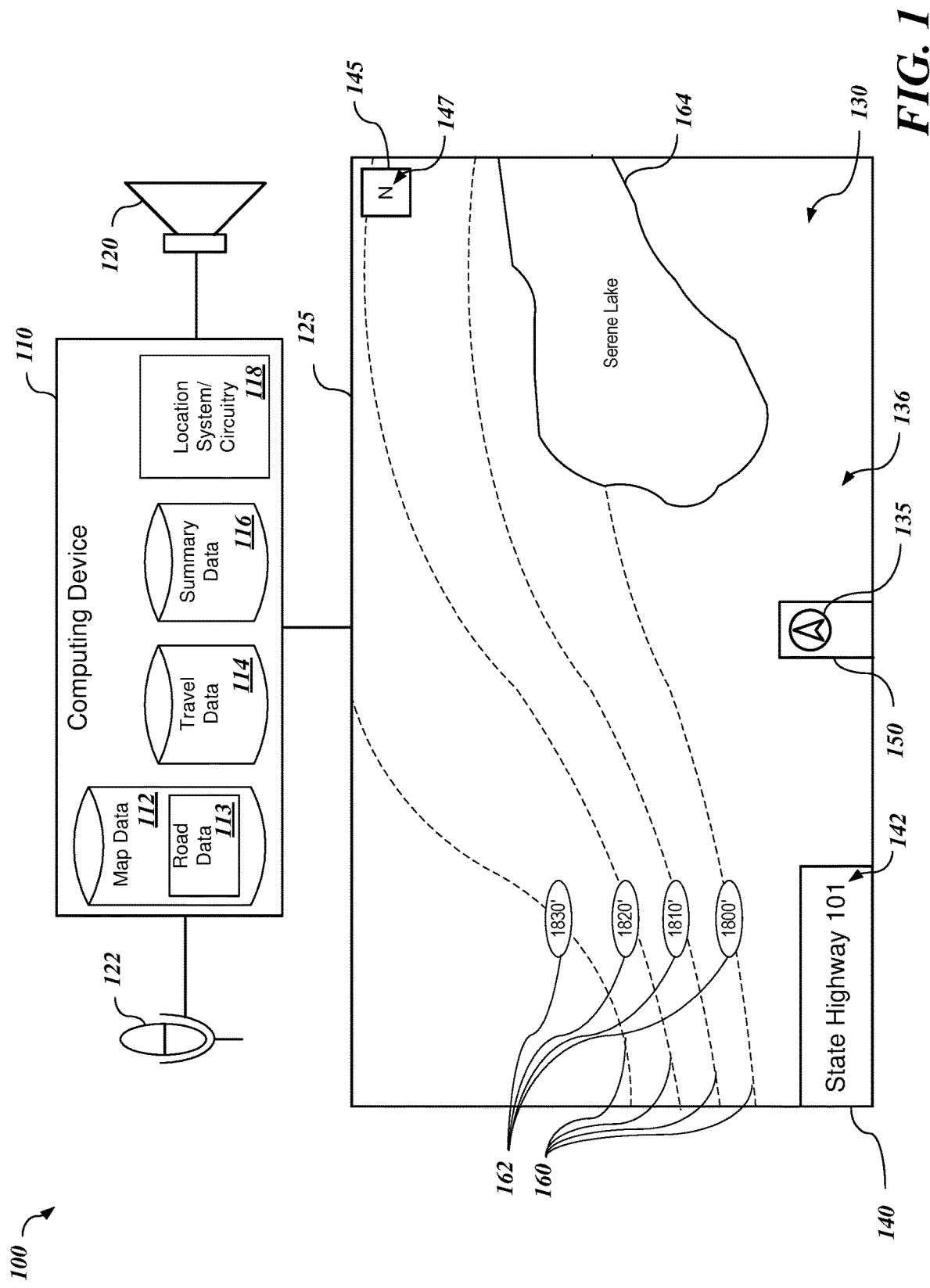
FIGS. 1-7 and 9-14 are block diagrams of an illustrative system and illustrative screen displays for a system that tracks off-road travel.

Referring to FIG. 1, an illustrative system 100 includes a computing device 110 that is operated according to computer-executable instructions configured to cause the computing device 110 to perform off-road tracking and related functions as described herein. The computing device 110 may include a computer system with a processor, memory, storage, and other devices, as further described below with reference to FIG. 19. In performing off-road tracking, the computing device 110 includes memory and/or storage that maintains map data 112 (which includes road data 113 for recognized roads in an area covered by the map data 112), travel data 114 representing travel of the vehicle, summary data 116 of the travel data 114, and a location system and/or circuitry 118 to monitor a location of the system 100, as further described below. In various embodiments, for example when the system 100 is carried aboard or integrated with a vehicle, the location system 118 generates travel data to provide navigational assistance and/or that can be stored to record information about off-road travel (or other travel) in the travel data 114.

In various embodiments, the computing device 110 is in communication with a display 125. In various embodiments, the display 125 is an interactive touchscreen device capable of providing output from and receiving input to the computing device 110. In various embodiments, the computing device 110 also may be in communication with a noninteractive display that receives input from a keyboard, pointing device, or other input devices. In various embodiments, the computing device 110 also may include an audio input interface 122, such as a microphone, to receive verbal input and/or an audio output interface 120, such as a speaker. For purposes of the foregoing examples, it is assumed that the display 125 is an interactive display operable to receive inputs via user engagement with the display as well as by using other available input devices.

In various embodiments, the computing device 110 identifies the vehicle location 135 determined by the location system 118 on the map data 112 to generate a location map 130 that is presentable via the display 125. The location map 130 displays a vehicle location 135 representing the location of the person and/or vehicle carrying the system 100 in an area encompassing the vehicle location 135. In various embodiments, when the computing device 110 identifies the vehicle location 135 at a place identified on the map data 112, the location map 130 includes a location identifier 140. In various embodiments, when the vehicle location 135 is on a recognized road 150, the vehicle location 135 is depicted on the location map 130 as positioned on the recognized road 150 and the location identifier 140 presents a road name 142 of the recognized road 150.

In various embodiments, the location map 130 also may include an orientation indicator 145 identifying a direction of travel 147 of the system 100 as determined by the location system 118, such as by using a compass or another system for determining present orientation. As described below, in various embodiments, the system 100 periodically monitors the location of the system 100 and, when traveling off-road, may record the location of the system 100 to the travel data 112 to record the off-road trip.

In various embodiments, the location map 130 also may include geographical and/or topographic information about the area encompassing the location. For example, the location map 130 includes contour lines 160 connecting points of equal elevation and/or elevation indicators 162 representing an elevation of one or more of the contour lines 160 to communicate to a user changes in elevation of the surrounding area. The location map 130 also may include landmarks, structures, hazards, bodies of water, or other features, such as a lake 164 in the area encompassing the location. In various embodiments, how the location map 130 is presented is adjusted based on whether the location is on a recognized road 150 or is off-road, as further described below. For purposes of the foregoing example, it is assumed the system 100 is transported aboard a vehicle that drives on roads, such as the recognized road 150 and/or off-road. By contrast, if the system 100 is carried by a person, the system 100 may depict the person's location instead of a vehicle location, whether the person is traveling on a recognized road 150 or off-road.

In various embodiments, when the system 100 is being transported on the recognized road 150, the vehicle location 135 is presented toward an edge 136 of the location map 135. Presenting the vehicle location 135 toward an edge 136 of the location map 135 provides a user with a largest perspective of the direction of travel. It will be appreciated that showing the largest possible perspective of the direction of travel may, for example, provide the user of a vehicle with the largest possible perspective of upcoming roads and/or the longest possible reaction time to upcoming turns.

Figure 2:
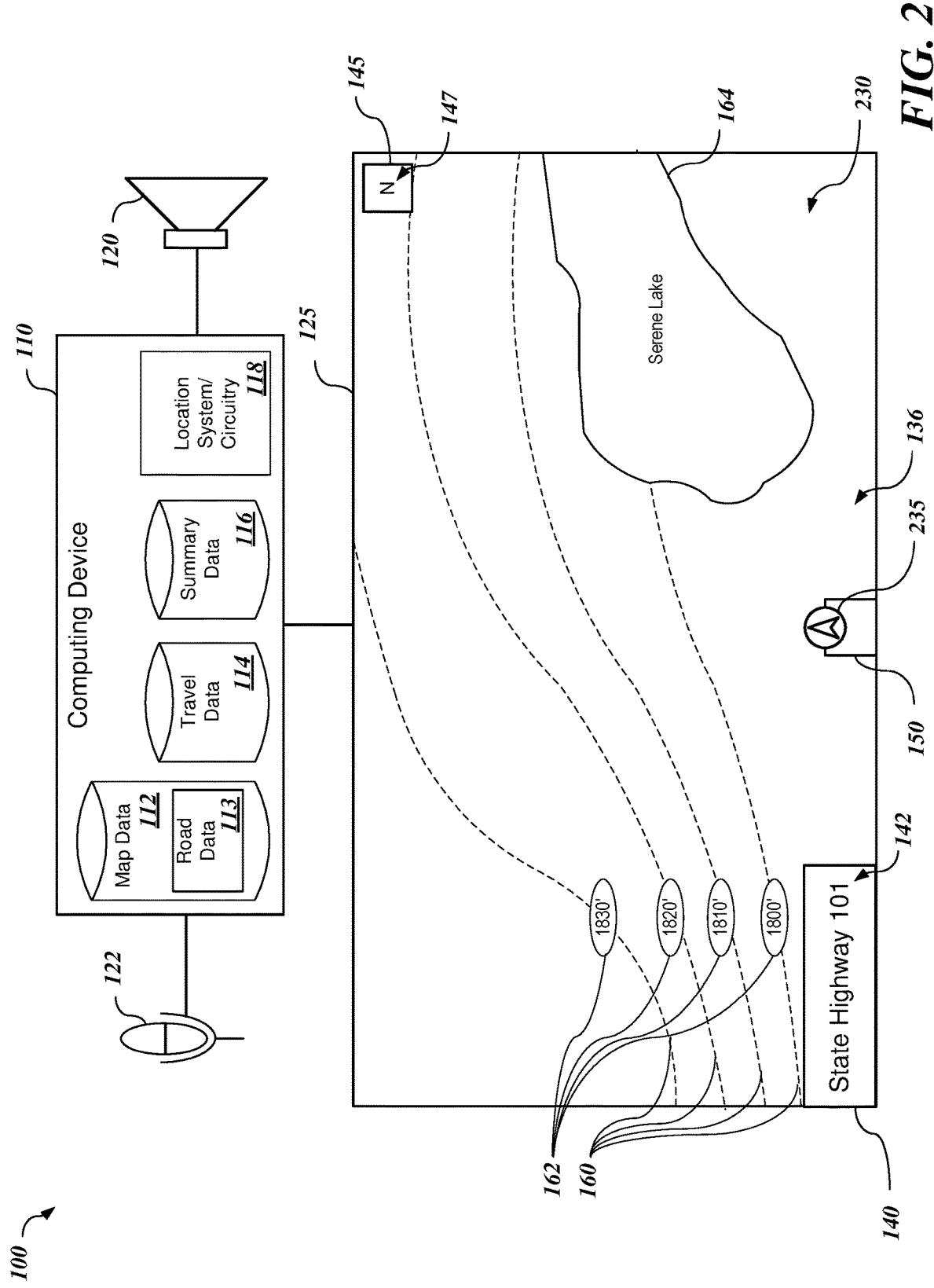

Referring additionally to FIG. 2, as the system 100 continues to move in a same direction on the recognized road 150, the location map 230 is updated to show the change in the vehicle location 235 relative to the surrounding area. Because the vehicle continues to move on the recognized road 150, the vehicle location 235 shows the updated location of the vehicle relative to the recognized road 150. In the example of FIG. 2, the vehicle location 235 is nearing an end of the recognized road 150 in preparation for initiating off-road travel, as described further below. The location identifier 140 continues to display the road name 142 of the recognized road 150. Because the vehicle continues to move in a same direction, the orientation indicator 145 continues to display the same direction of travel 147.

Figure 3B:
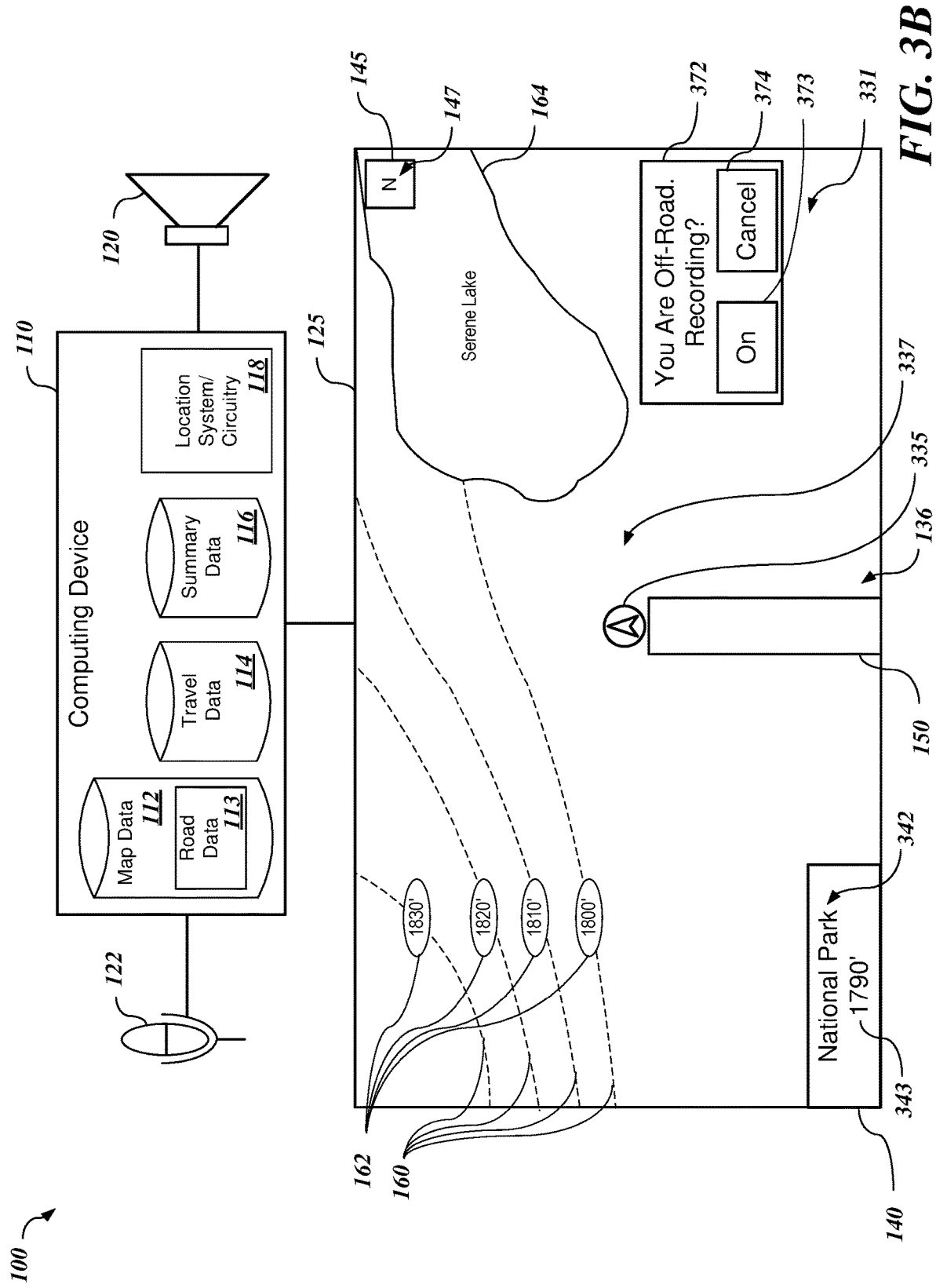

Referring additionally to FIGS. 3A and 3B, in various embodiments as the system 100 moves off of the recognized road 150 and begins off-road travel, the location map 330 may be changed in one or more ways. In various embodiments, the location identifier 140 is updated to replace the road name 142 (FIGS. 1 and 2) with an area name 342. As in identifying the recognized road 150, the computing device 110 may use the location determined by the location system 118 to identify the area in which the vehicle is traveling in order to determine and present the area name 342. In various embodiments, the location identifier 140 also may include a current elevation 343 of the system 100. Because the vehicle continues to move in a same orientation, the orientation indicator 145 continues to display the same direction of travel 147.

In various embodiments, the location map 335 is reframed for off-road travel with the vehicle location 335 positioned toward a center 337 of the location map 330 instead of at the lower edge 136 of the location map 130 as in the on-road driving examples of FIG. 1. It will be appreciated that a vehicle that is traveling on-road may be expected to continue to travel on the roads and it may be useful to a user to have the location map 130 be centered on the road or roads ahead to provide notice of possible upcoming turns or options to turn, as previously described. By contrast, with off-road driving, the vehicle is not constrained to stay on a predicted path, so it may be as useful to be equally aware of the terrain behind the vehicle as with the terrain ahead of the vehicle in making decisions as to which way to travel. Accordingly, when traveling off-road, the location map 330 is recentered with the vehicle location 335 at the center 337 of the location map 330 to provide an equal perspective of the area around the vehicle. With the location map 330 being recentered, positions of features on the location map 330, such as the recognized road 150, the contour lines 160, and any landmarks, structures, hazards, bodies of water, or other features included in the location map 330, such as the lake 164, are repositioned. In various embodiments, it will be appreciated that the user may be provided with options to maintain the centering of the vehicle location 335 at the edge 136 of the location map 330 during off-road travel or to center the vehicle location 335 during on-road travel through user-selectable options that may be engageable via a menu option (not shown) or with a verbal command receivable by the computing device 110 via the audio input interface 122.

In various embodiments once the vehicle moves off of the recognized road 150 and commences off-road travel the system 100 may automatically begin recording data about the off-road travel. The data recorded is further described below with reference to FIG. 8. To signal that recording has commenced, an off-road recording indicator 370 is presented on the location map 330 to let the user know that data is being captured about the off-road travel. In various embodiments, the user may be presented with the option to discard or delete the recorded data, as described below with reference to FIG. 7.

As shown in FIG. 3B, in various embodiments, instead of automatically commencing the recording of data about off-road travel, when the vehicle commences off-road travel the user is prompted as to whether to record such data. A recording menu 372 may be presented on the location map 331, giving the user a recording on option 373 to enable or continue the recording of data about the off-road travel. The recording menu 372 also may include a stop or cancel option 374 to stop or cancel the recording of the off-road travel if the user does not desire to preserve a record of the off-road travel. The user may select the recording on option 373 or the stop or cancel option 374 via the display 125 or via the audio input interface 122 or another input device. In various embodiments, the user also may be provided with options to automatically select whether to record travel data upon initiating off-road travel (as described with reference to FIG. 3A), whether to be prompted not to record off-road travel data, or not to record off-travel data unless requested. These user-selectable options may be engageable via a menu option (not shown) or with a verbal command receivable by the computing device 110 via the audio input interface 122. As previously described, in various embodiments, the user also may be presented with the option to discard or delete the recorded data, as described below with reference to FIG. 7.

Figure 4:
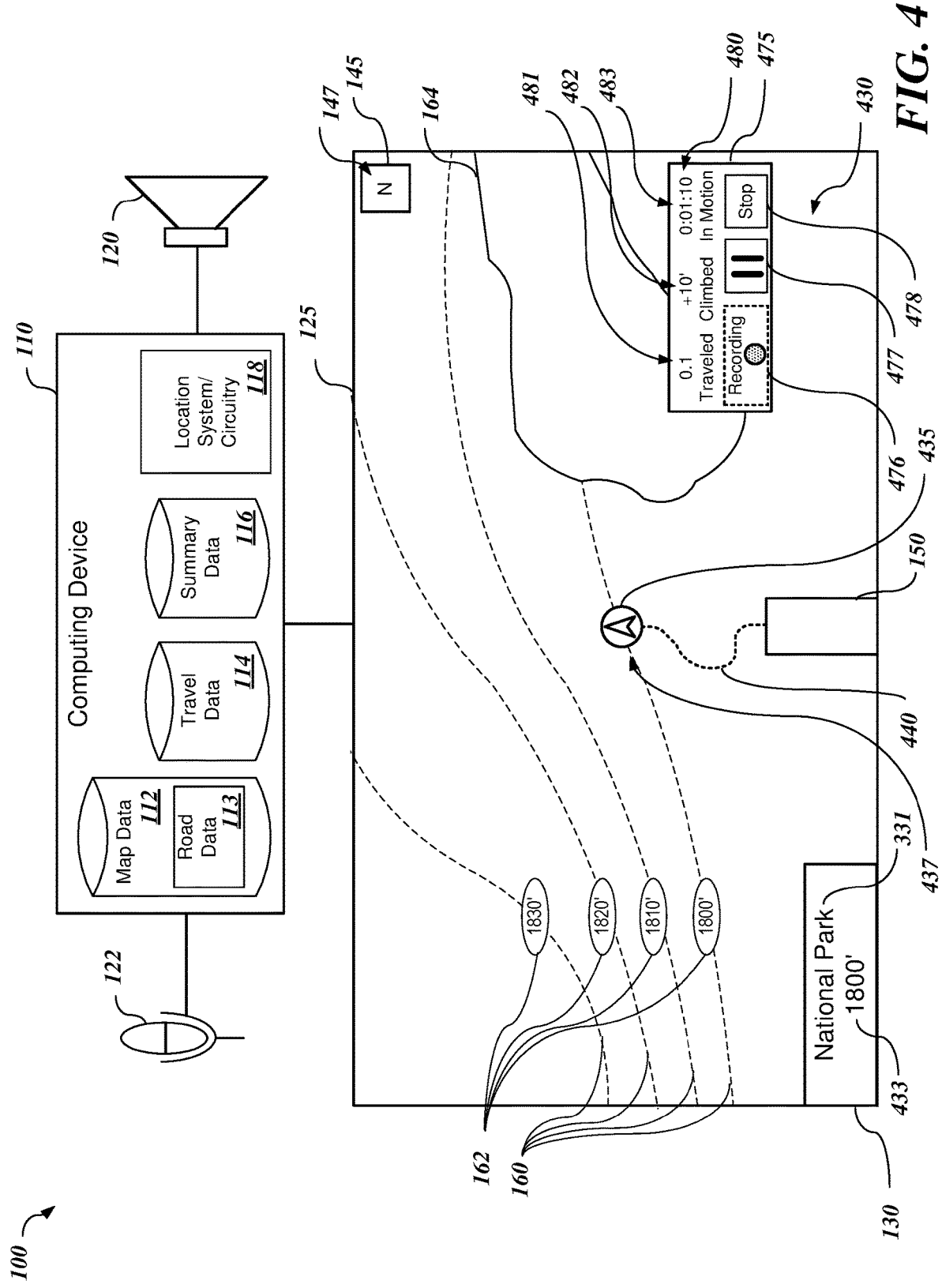

Referring additionally to FIG. 4, in various embodiments as the system 100 continues to travel off-road, the location map 430 may present additional information to the user. In various embodiments, as the system 100 continues to move, the vehicle location 435 is maintained at a center 437 of the location map 430. With the location map 430 remaining centered on the vehicle location 435, as previously described with reference to FIGS. 3A and 3B, positions of features on the location map 430 are repositioned relative to the vehicle location 435, including the recognized road 150, the contour lines 160, the lake 164, and/or any other landmarks, structures, hazards, bodies of water. Because the system 100 is again moving in a same direction, the orientation indicator 145 continues to identify the same direction of travel 147.

In addition, in various embodiments, a route traveled 440 is displayed on the location map 430. Using data recorded in the travel data 114, the computing device 110 tracks points through which the system 100 has traveled, plots the route traveled 440, and displays the route traveled 440 via the display 125 to provide a visual indication of the off-road travel that has occurred since the system 100 left the recognized road. As previously described, in various embodiments, whether to record data regarding the off-road travel may be selectively initiated or stopped by a user. Further, in various embodiments, a user may be provided with an option whether to display the route traveled 440 while the off-road travel is taking place.

In various embodiments, a status window 475 is displayed on the location map 430 during the off-road travel. In various embodiments, the status window 475 may include a recording key 476 that is highlighted to indicate that the off-road travel data is being recorded, as well as a pause input 477 to pause the recording of the data and a stop input 478 to stop the recording of the off-road travel data. The accumulation of the summary travel information 480 may be stopped or paused using the inputs 477 and 478. For example, in various embodiments, if the user stops moving and wishes to pause the elapsed time of travel 483, engaging the pause input 477 may stop the counting of the elapsed time so that any time spent stopped is not included in the elapsed time of travel 483. The pause input 477 may be a toggle-type switch so that the tracking may be restarted upon again engaging the pause input 477. As previously described, the inputs 477 and 478 may be engaged via the display 125, with a verbal input presented via the audio input interface 122, or via another input device.

The status window 475 also may present the user with summary travel information 480, including a distance traveled 481, an elevation change 482, and an elapsed time of travel 483. In various embodiments, one or more elements of the summary travel information 480 may be audibly presented via the audio input interface 120 on demand or at predetermined or user-selected intervals. In various embodiments, the status window 475 also may be invoked for on-road travel at a user's options.

Figure 5:
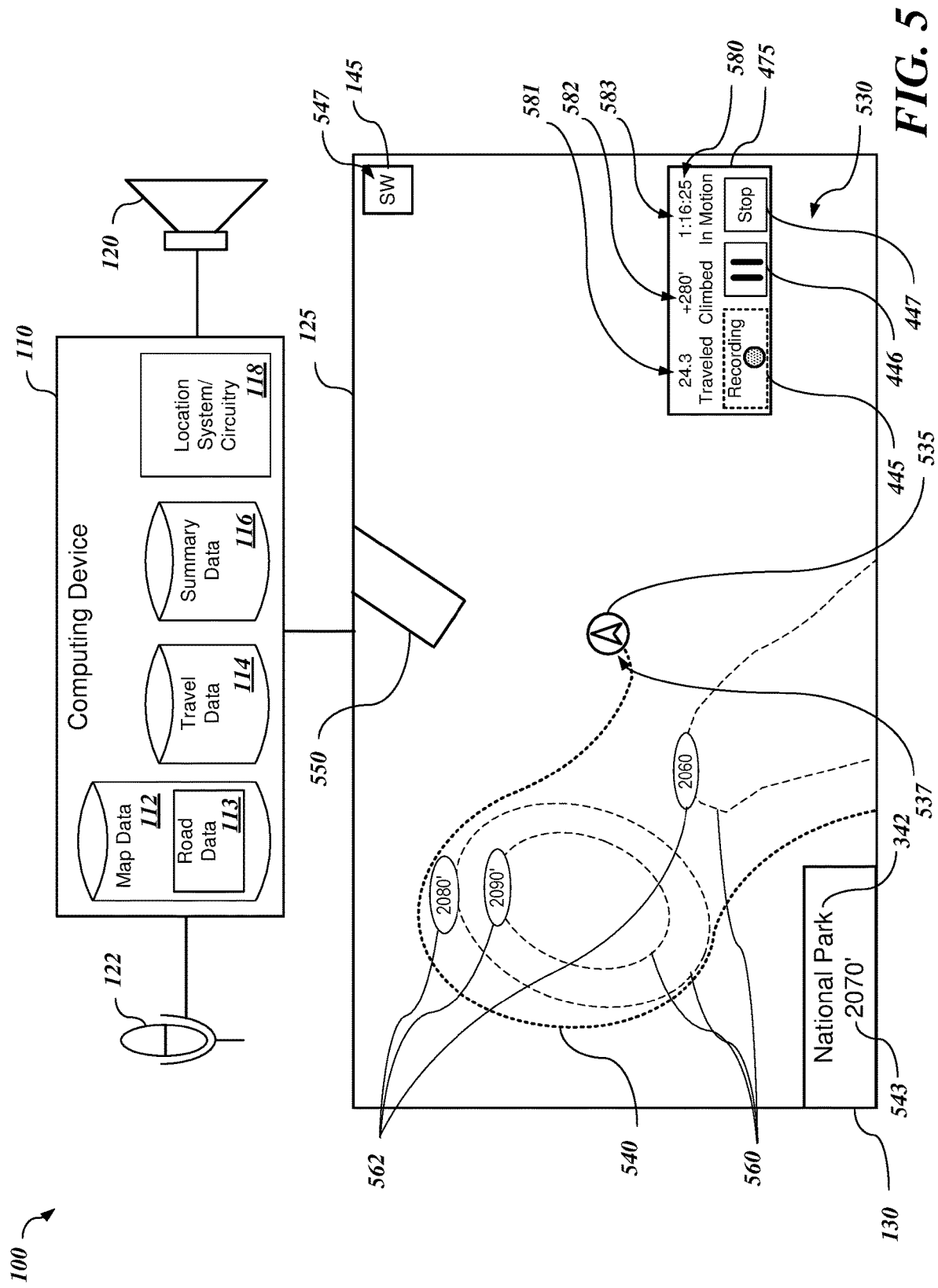

Referring additionally to FIG. 5, the off-road travel has continued for to a new location as shown in the location map 530. The vehicle location 535 continues to be positioned at a center 537 of the location map 530. The location map 530 has been updated to show different contour lines 560 with elevation indicators 562 to represent the new location. The location identifier 140 continues to display the area name 342 and displays an updated current elevation 543 of the system 100. The orientation indicator 145 indicates that the system 100 is moving in a different direction of travel 547. An updated route traveled 540 is displayed on the location map 530, showing a portion of the off-road travel to this point. It will be appreciated that the previous route traveled 440 (FIG. 4) is not included on the location map 530 because the system has moved to a different location away from the start of the off-road travel. In various embodiments, however, a scale of the location map 530 may be changed to accommodate a larger portion of the updated route travelled 540 or an entirety of the updated route traveled 540, either continually or on demand based on a user input.

The status window 475 continues to be displayed on the location map 530. In various embodiments, updated summary travel information 580 maintains running totals of a distance traveled 581, an elevation change 582, and an elapsed time of travel 583 (which vary from the distance traveled 481, the elevation change 482, and the elapsed time of travel 483 previously reported at an earlier point in the off-road travel as described with reference to FIG. 4). As previously described, the accumulation of the summary travel information 580 may be stopped or paused using the inputs 477 and 478. The off-road travel may continue for an extended time away from recognized roads, so no roads may be included on the location map 530. However, FIG. 5 shows that the system 100 is approaching a second recognized road 550.

Figure 6:
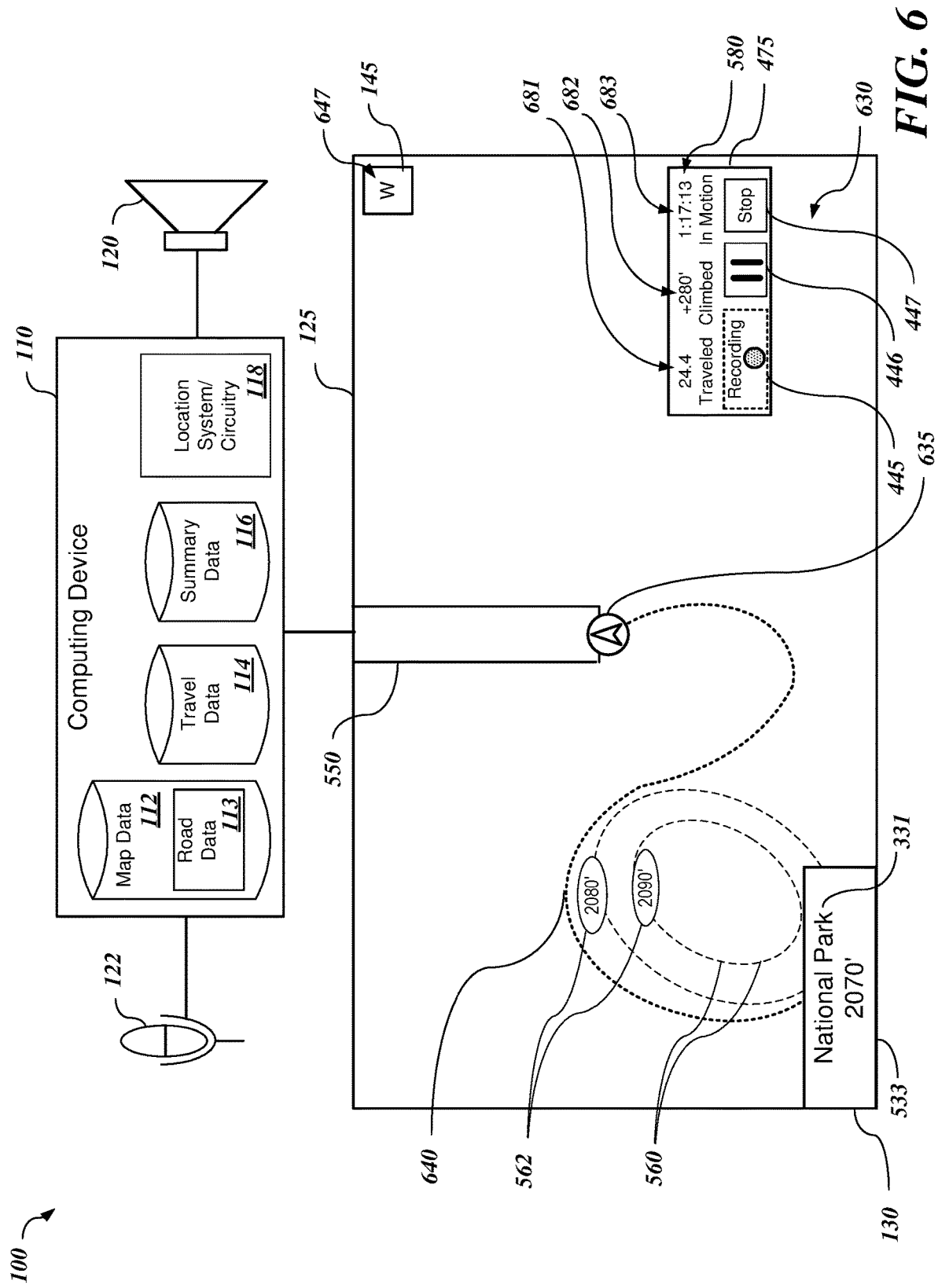

Referring additionally to FIG. 6, as shown by the vehicle location 635 relative to the area represented on the location map 630, the route traveled 640 indicates that the system 100 approaches the second recognized road 550. As previously described, in various embodiments the location map 630 is adjusted to maintain the location indicator 635 toward a center 637 of the location map 630, thereby resulting in the second recognized road 550 appearing to approach the location indicator 635 as the vehicle moves toward the second recognized road 550. In various embodiments, updated summary travel information 680 includes updated running totals of a distance traveled 681, an elevation change 682, and an elapsed time of travel 683. Because the direction of travel has turned to face the second recognized road (as compared to the location map 530 and the location indicator 535 of FIG. 5) the orientation indicator 145 indicates that the system is moving in a different direction of travel 647 as the vehicle turns to enter the second recognized road 550.

Figure 7:
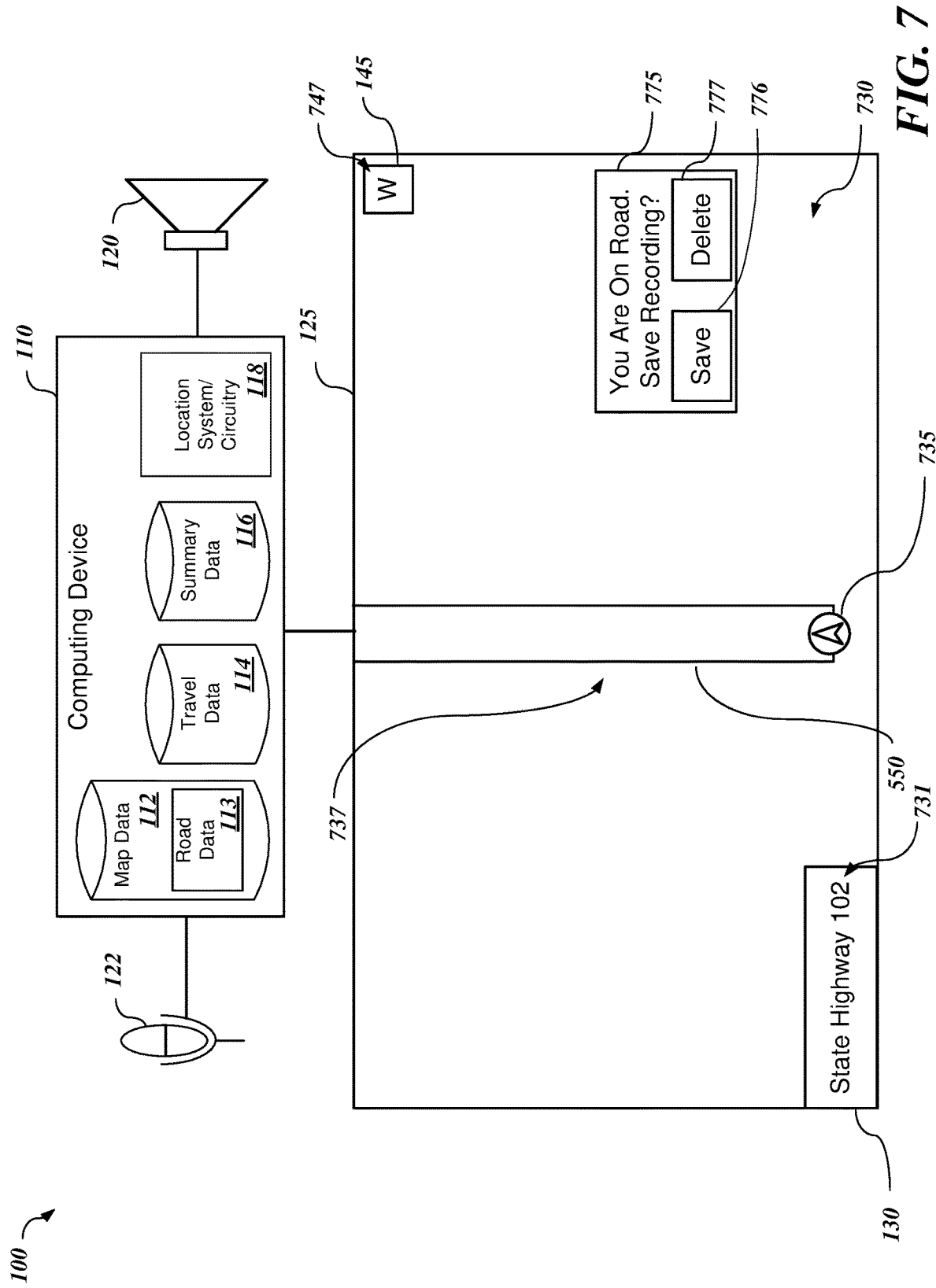

Referring additionally to FIG. 7, the location map 730 shows the location indicator 735 entering the second recognized road 550, thereby both initiating on-road travel and ending the off-road travel. Analogous to the changes presented on the location maps 330 and 331 (FIGS. 3A and 3B) as the off-road travel was initiated, in various embodiments the location map 730 is modified in the switch to on-road travel. In various embodiments, the location identifier 140 is updated to replace the area name 342 (FIGS. 3A-6) with a road name 742 of the second recognized road 550. In various embodiments, in conducting on-road travel, the location identifier 140 does not include a current elevation (as shown in FIGS. 3A-6). The orientation indicator 145, however, continues to display the same direction of travel 747, which was the same upon ending the off-road travel and initiating the on-road travel.

In various embodiments, and as previously described, the location map 735 is reframed for on-road travel with the location designation 735 positioned toward an edge 736 of the location map 330 instead of at the center of the location map 730. As previously explained, it will be appreciated that a vehicle that is traveling on-road may be expected to continue to travel on the roads and it may be useful to a user to have the location map 730 be centered on the road or roads ahead to provide notice of possible upcoming turns or options to turn. Nonetheless, in various embodiments as previously described, the user may be provided with options to maintain the centering of the location indicator 735 at the center 737 of the location map 730.

In various embodiments, once off-road travel ends, the status window 475 is replaced with a save recording window 775 to inquire whether the user wishes to save the travel data for the off-road trip. The user may select a save option 776 to save the data for later retrieval, as described below, or may select a delete option 777 to stop the data from being saved.

Figure 8:
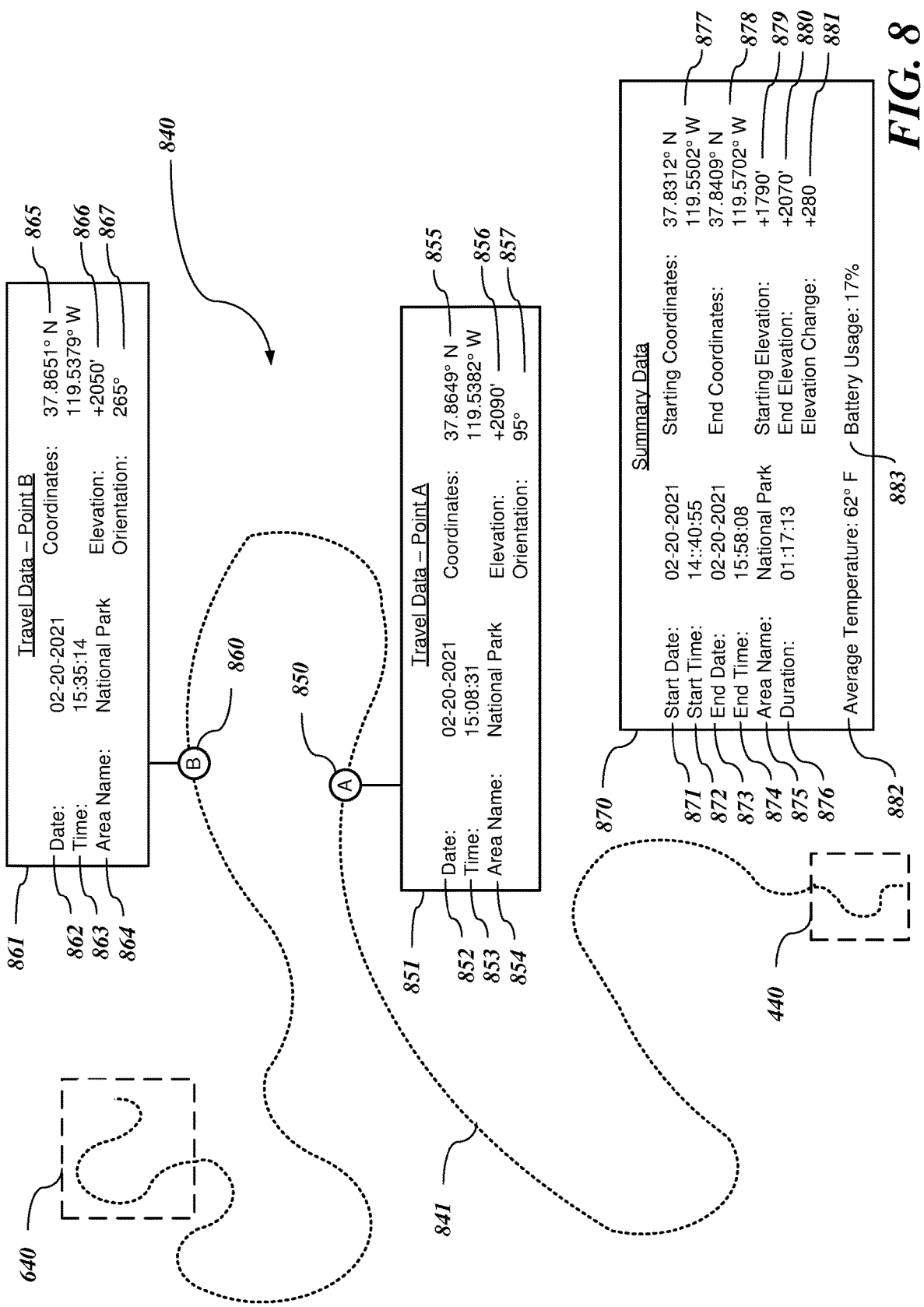
FIG. 8 is a schematic diagram of a previously-taken off-road trip with travel data and summary data associated therewith.

Referring additionally to FIG. 8, a route traveled 840 represents the off-road travel described with reference to FIGS. 4-7 such as the segments of the previous route traveled 440 (FIG. 4) and 640 (FIG. 6) as previously described, as well as an additional segment of off-road travel 841 between segments of the previous route traveled 440 and 640 (not previously shown in FIGS. 4-7). Data associated with the route traveled 840 includes a series of data points captured during the off-road travel, such as Point A 850 and Point B 860. In various embodiments, at regular intervals set by time and/or distance traveled along the route traveled 840, travel data is sampled and recorded for potential storage for a number of such points. The data elements collected may include a number of values for each of the points along the route traveled for which data is collected.

For example, for Point A 850, the data elements included in the travel data 851 may include a date 852 and a time 853 recorded for when Point A 850 was reached. The travel data 851 also may include an area name 854, which would include the area name 331 of the off-road area determined from the map data 112 as previously described for off-road travel or could include a name of a recognized road determined from the map data 112 if one chose to record travel data for on-road travel. Positional coordinates 855, such as but not limited to latitudinal and longitudinal coordinates, also may be included in the travel data 851 for Point A 850. The travel data 851 for Point A 850 also may include an elevation 856 at Point A 850 and an orientation 857 of the vehicle. The elevation 856 may be retrieved from the map data 112 (which may include elevation data as shown by the contour lines 160 and elevation indicators 162) or may be measured by an altimeter or other sensor associated with the computing device 110 (FIGS. 1-7). The orientation 857 may be measured by a compass or similar device associated with the computing device 110. For another example, for Point B 860, the travel data 861 may include a date 862 and a time 863 when Point B 860 was reached, an area name 864, positional coordinates 865, an elevation 866, and an orientation 867 of the vehicle at Point B 860. The collection of data for each of the points along the route travelled 840 creates a complete log of the route traveled 840 during the off-road travel. Some or all of the data elements may be captured in the travel data 114 of the computing device 110.

In addition to the travel data for each of the points along the route traveled 840, such as the travel data 851 for Point A 850 and the travel data 861 for Point B 860, summary data 870 may be recorded for the route traveled 840. As further described below, the summary data 870 may be retrievable by a user to review the route traveled 840 in subsequently reviewing and/or in considering whether to retrace the route, as further described below. The summary data 870 may include data and/or calculate data from the travel data 114 for the points along the route traveled 840. The summary data 870 may include a start date 871 and a start time 872 of a point at which the off-road travel (or other recorded travel) commenced or when the recording commenced. Correspondingly, the summary data 870 may include an end date 873 and an end time 874 of a point at which the off-road travel (or other recorded travel) ended or when the recording ended. The summary data 870 may include an area name 875, like the area names 854 and 864 retrievable from the map data 112. The summary data 870 may include a duration 876 of the off-road travel between the start time 872 and the end time 874, possibly deducting any time for which recording was paused as previously described with reference to FIG. 4. The summary data 870 also may include starting coordinates 877 of a point at which the off-road travel (or other recorded travel) commenced or when the recording commenced. The summary data 870 also may include ending coordinates 878 of a point at which the off-road travel (or other recorded travel) ended or when the recording ended. The summary data 870 also may include a starting elevation 879 and an ending elevation 880 of the points at which the off-road or other recorded travel began or ended (or for which recording began or ended), respectively. The summary data 870 also may include an elevation change 881 representing a difference between the starting elevation 879 and the ending elevation 880. The summary data 870 also may include an average outside temperature measured during the trip 882. The summary data 870 also may include a power usage for the trip 883 which, in the example of an electric vehicle, may be described as a percentage of battery power used. The summary data 870 may be stored in the summary data 116 of the computing device 110.

Figure 20:
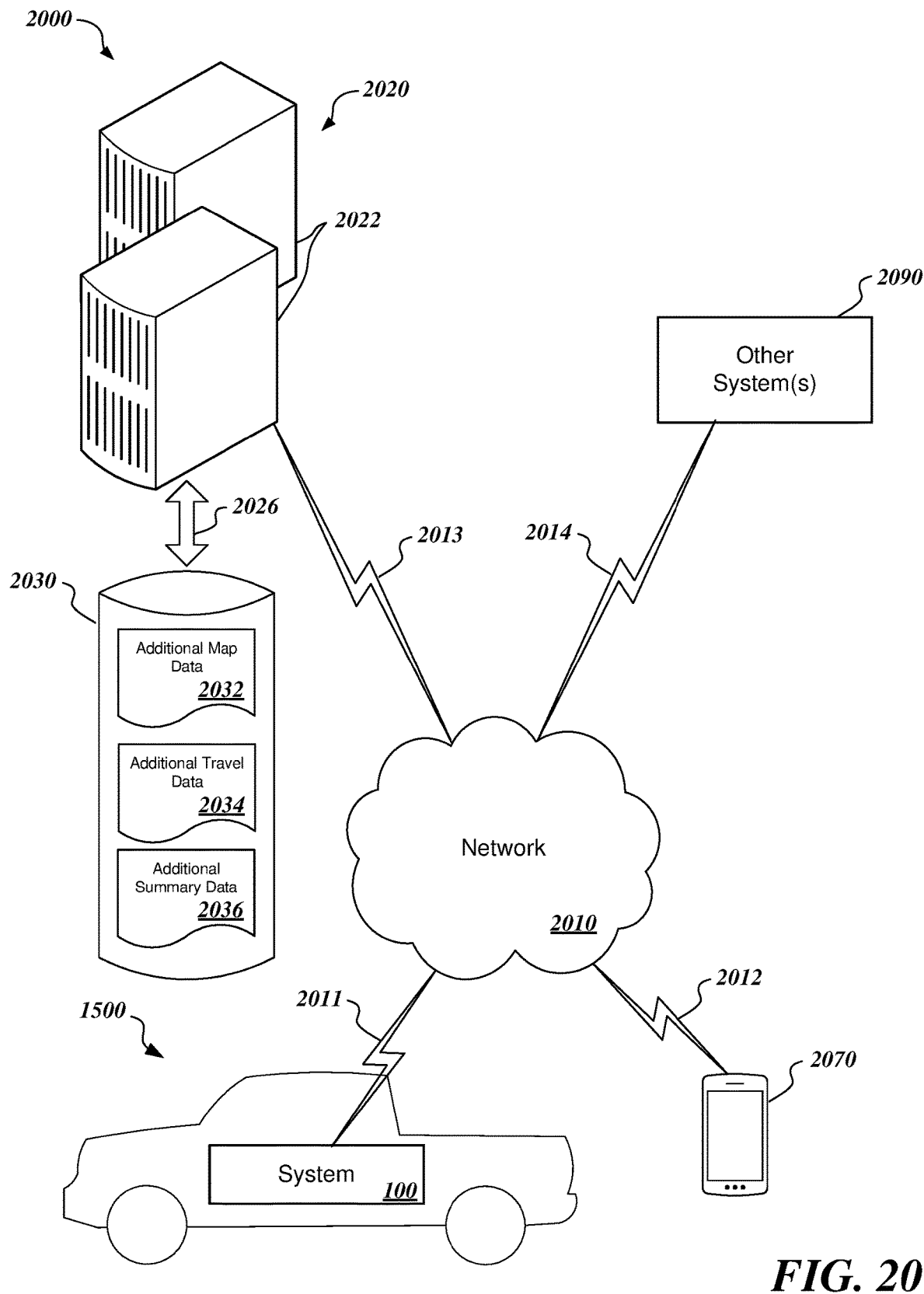
FIG. 20 is a block diagram of one or more illustrative systems of FIGS. 1-14 communicating with one or more remote systems.

In various embodiments, a user may review the summary data 870 to contemplate the previously-taken route 840 and/or revisit and re-travel the route 840. It will be appreciated that travel data 114 and summary data 116 may be stored for a number of previously-taken routes for later reconsideration or re-travel, as described with reference to FIGS. 9-14. The routes may be stored in the computing device 110 or on another computing device for subsequent retrieval, such as the computing devices described below with reference to FIGS. 18 and 20. For example, a user may retrieve the information about the route 840 on a mobile computing device 1850 (FIG. 18) from the computing device 110 or a remote computing system 2020 (FIG. 20).

Figure 9:
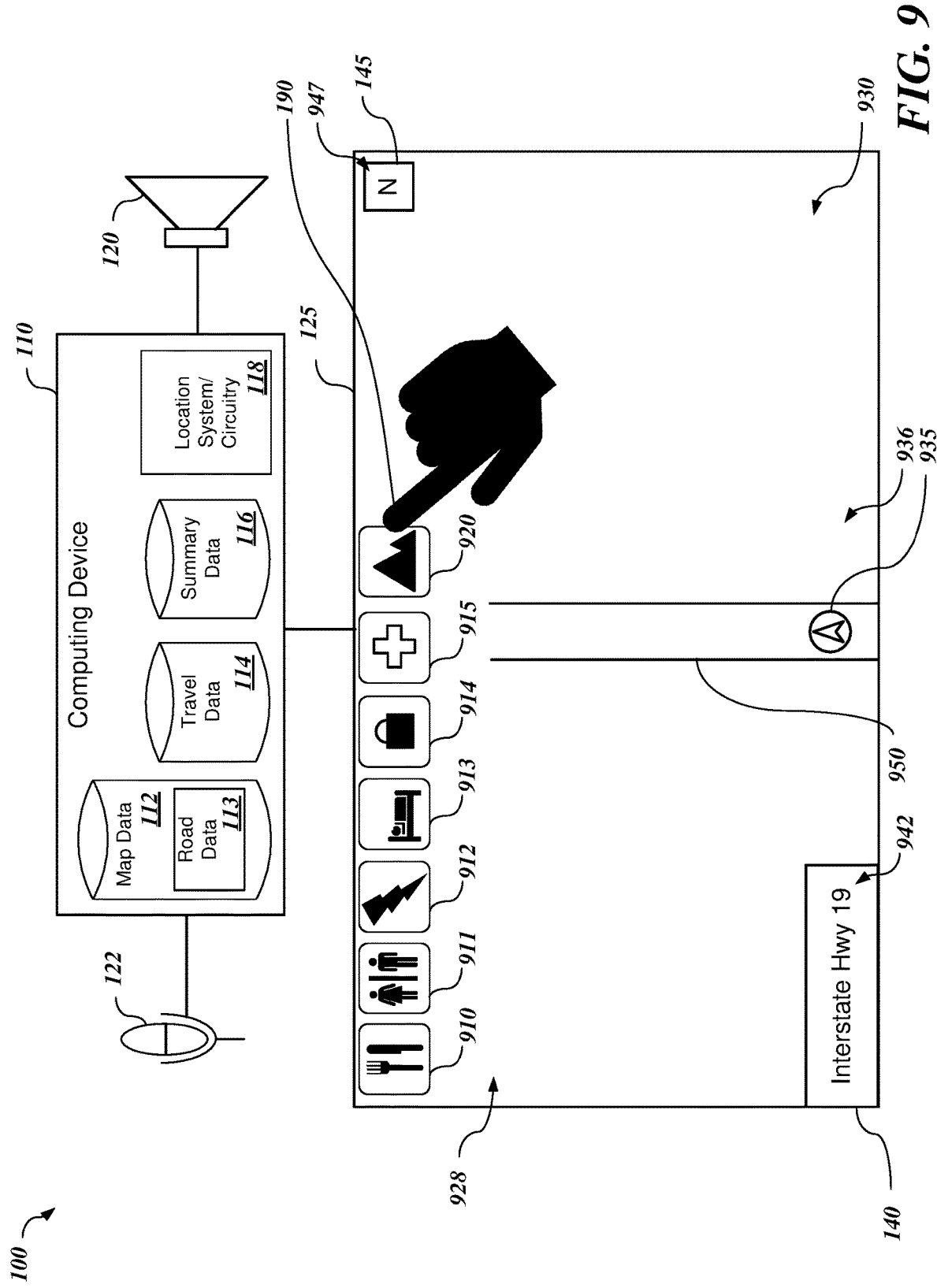

Referring additionally to FIG. 9, as previously mentioned the system 100 permits retrieval of information regarding previous routes. In various embodiments, the system 100 presents a travel screen 928 when the system 100 is traveling to show a map 930 and a vehicle location 935 relative to the map 930. The vehicle location 935 is traveling on a third recognized road 950 and, as previously described with reference to FIG. 2, the map 930 is positioned with the vehicle location 935 toward a lower edge 936 of the location map 930. The location identifier 140 presents a road name 942 of the third recognized road 950. The orientation indicator 145 identifies a direction of travel 947.

In various embodiments, along with the location map 930, the display 125 may present various input keys 910-915 to enable the user to identify or find nearby services of various types. For example, the keys 910-915 may include a food/restaurant key 910, a restrooms key 911, a charging or fuel station key 912 (depending on whether the system 100 is associated with an electric vehicle or an internal-combustion-powered vehicle), a hotel/lodging key 913, a shopping key 914, a medical services key 915, and the like. Engaging one of these keys 910-915 may cause the system 100 to show service establishments of the selected type on the location map 930 and/or to provide directions to a selected service. The input keys 910-915 also may be physical keys separate from the display, or the services may be queried with a verbal input to the audio input interface 122 or another input device.

In various embodiments, in addition to the keys 910-915, an off-road key 920 or another input may be used to retrieve off-road trips from the travel data 112. The off-road trips may include trips previously taken by the user and recorded as described with reference to FIGS. 3A-8. In addition, the travel data 112 also may include suggested off-road trips for which data is made available by a provider of the system 100 or off-road trips taken and recorded by other users and shared via a network as further described below with reference to FIG. 20.

Figure 10:
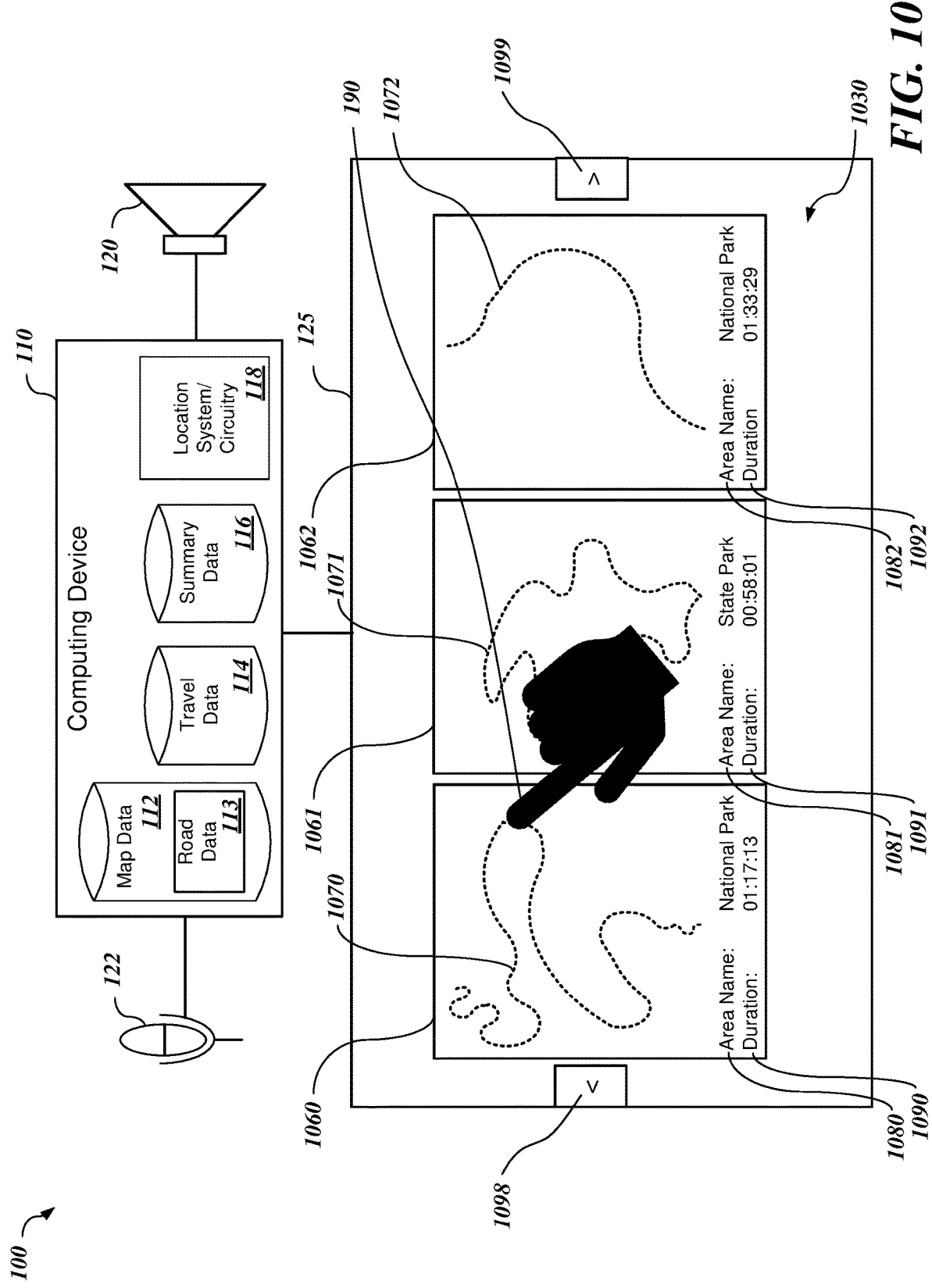

Referring additionally to FIG. 10, in response to the user engaging the off-road key 920 (FIG. 9), a route menu 1030 or similar interface may be presented via the display to enable the user to select from available off-road trips, whether previously taken by the user or made available from another source as previously described. In various embodiments, the route menu 1030 may include a text-based menu and/or graphical menus, potentially nested by category, distance, duration, or other considerations. In various embodiments, the route menu 1030 includes entries 1060-1062 for a number of off-road routes 1070-1072 which, in various embodiments, may be represented by thumbnail maps or other visual representations of the off-road routes 1070-1072. In various embodiments, the entries 1060-1062 may include an area name 1080-1082, respectively, identifying a general location of the off-road routes. In various embodiments, the entries 1060-1062 also may include representative information 1090-1092, respectively, regarding the off-road routes, such as a duration of the off-road trip and/or other descriptive information retrievable, for example, from the summary data 116 associated with the entries 1060-1062. In various embodiments, inputs 1098 and 1099 presented on the menu 1030 enable a user to scroll to one or more additional screens to consider other entries, or a user may provide verbal input via the audio input interface 122 or provide input via another interface.

To get more information about a particular entry, the user can select the entry with a digit 190 or with another input. For example, the user selects the entry 1060 for which the area name 1080 is the National Park and the representative information 1090 indicates a trip duration of 01:17:13. The selected entry 1060 happens to be the same trip for captured in the trip data as described with reference to FIGS. 1-8, but it will be appreciated that the selected entry 1060 may have included any trip previously taken by the user or a trip otherwise included in the trip data 112.

Figure 11:
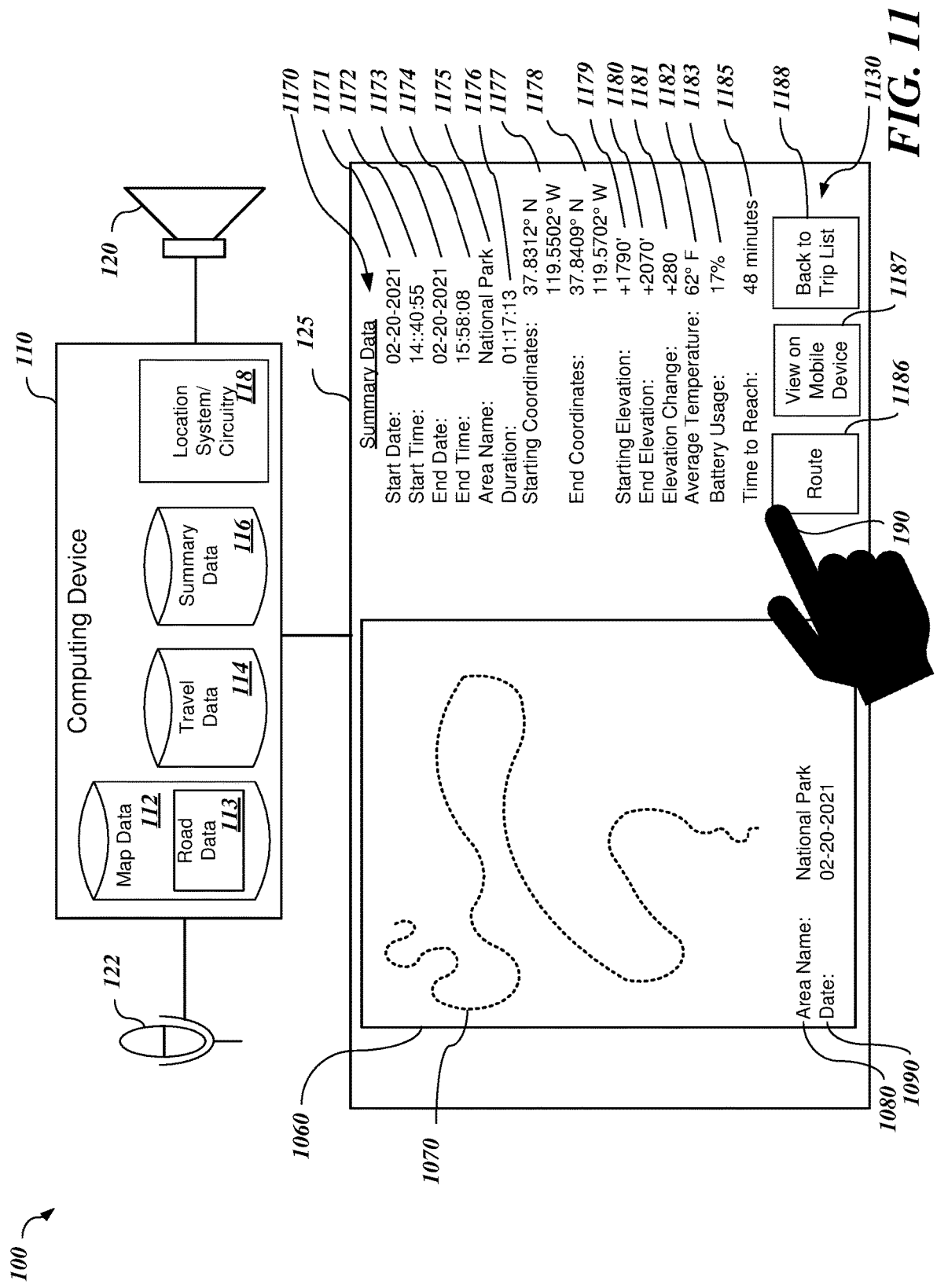

Referring additionally to FIG. 11, in various embodiments and in response to the user's selection of entry 1060 (FIG. 10), the system 100 provides a route summary screen 1130 including additional information and/or options about the trip associated with the entry 1060. In various embodiments, in addition to the map of the route 1070 the route summary screen 1130 may include the area name 1080, and the representative information 1090 and summary data 1170 associated with the entry 1060 may be retrieved from the stored summary data 116. As previously described with reference to FIG. 8, in various embodiments, the summary data 1170 may include a start date 1171 and a start time 1172 when recording of the route 1070 was commenced. Correspondingly, the summary data 1170 may include an end date 1173 and an end time 1174 of a point at which the recording of the route 1070 ended. The dates 1171 and 1173 and times 1172 and 1174 may be included for routes recorded by the system 100 but may not be included for trips included in the trip data 112 for which data may have been received from another source. The summary data also may include an area name 1175, a duration 1176 of the off-road travel between the start time 1172 and the end time 1174. The summary data 1170 also may include starting coordinates 1177 of a point at which the off-road travel (or other recorded travel) commenced or when the recording commenced and ending coordinates 1178 from a point at which the off-road travel (or other recorded travel) ended or when the recording ended. The summary data 1170 also may include a starting elevation 1179 and an ending elevation 1180 of the points at which the off-road or other recorded travel began or ended (or for which recording began or ended), respectively, as well as an elevation change 1181. The summary data 1170 also may include an average outside temperature 1182 that was measured during the recording of the route 1070. The summary data 1170 also may include a power usage 1182 for the route 1070 which, in the example of an electric vehicle, may be described as a percentage of battery power used.

In various embodiments, the trip summary screen 1130 also may present a user with additional information and options. In addition to the summary information 1170, the trip summary screen 1130 may present a travel time 1183 to reach the route 1070 described in the entry 1160. In various embodiments, the travel time 1183 may include on-road travel time to reach the starting coordinates 1177 of route 1070. The user may select a route option 1186 to be presented with directions or routing information to reach the route 1070, as further described below. The user also may select a view on mobile device option 1187 (such as the mobile computing device 2070 of FIG. 20, described below) to enable the user to review the data on another device. The user also may select a back option 1188 to return to the route menu 1030 (FIG. 10) or another screen. The user may select one of the options 1186 or 1188 with the digit 190 or with another tactile or verbal input. In the example of FIG. 11, the user selects the route option 1186 with the digit 190 to retrieve routing information.

Figure 12:
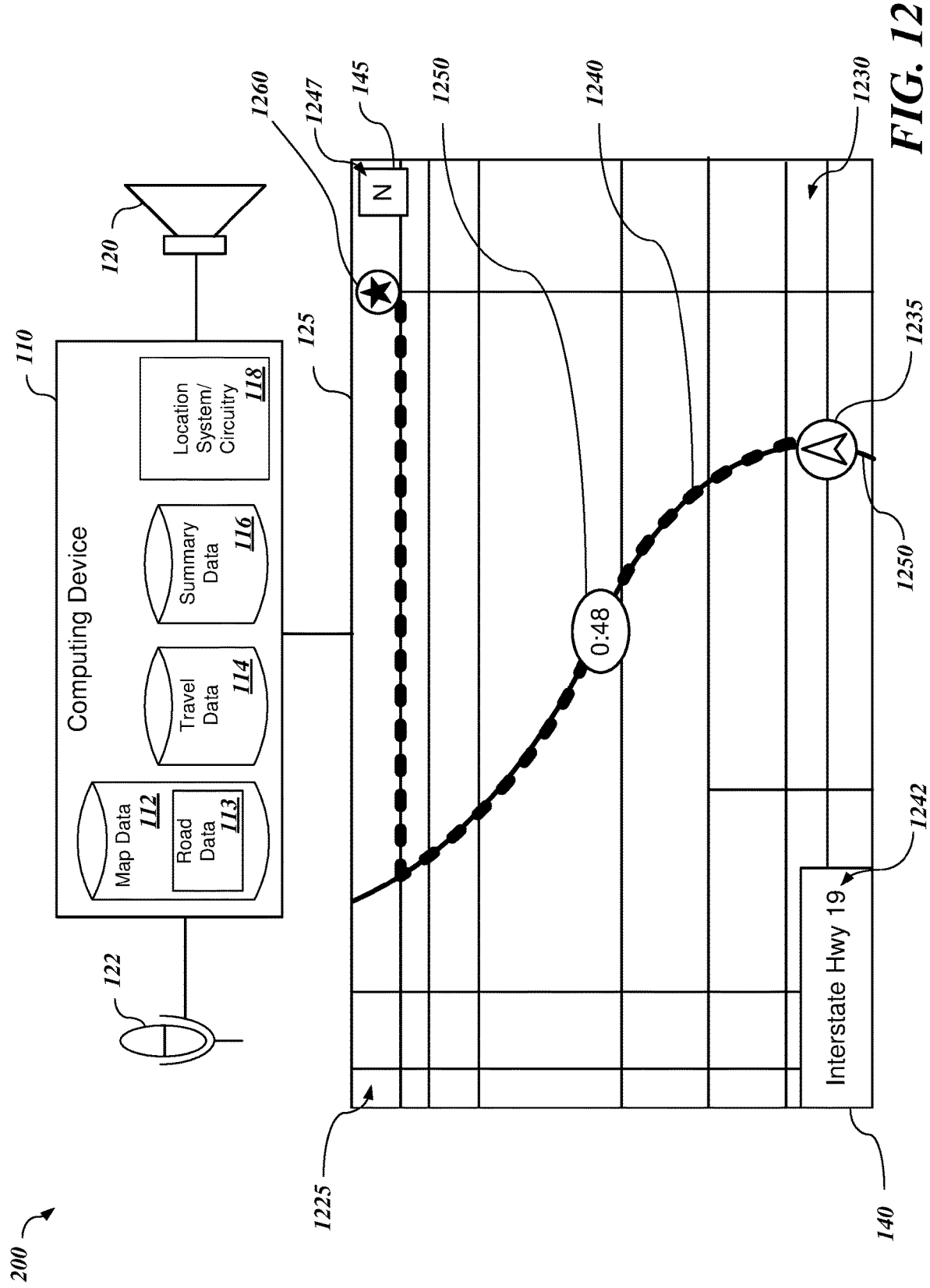

Referring additionally to FIG. 12, in various embodiments in response to the user's request for routing information (FIG. 11), a guidance screen 1225 presents an area map 1230 retrieved from the map data 112 of an area between the vehicle location 1235 and a destination 1260, which includes the location of the starting point of the route 1070 (FIG. 11). The area map 1230 includes one or more routes 1240 to reach the destination 1260 and an estimated travel time 1250 to reach the destination 1260. It will be appreciated that the estimated travel time 1250 is, at least initially, equivalent to the travel time 1182 to reach the route 1070 presented on the route summary screen 1130 (FIG. 11). The guidance screen 1225 also includes the location identifier 140 which, in various embodiments, includes a road name 1242 of a fourth recognized road 1250 that coincides with the vehicle location 1235. Thus, in various embodiments, after selecting the route 1070, the system 100 can guide the user to the route 1070. In a self-driving vehicle, the vehicle can use the guidance information to automatically guide the vehicle to the route 1070.

Figure 13:
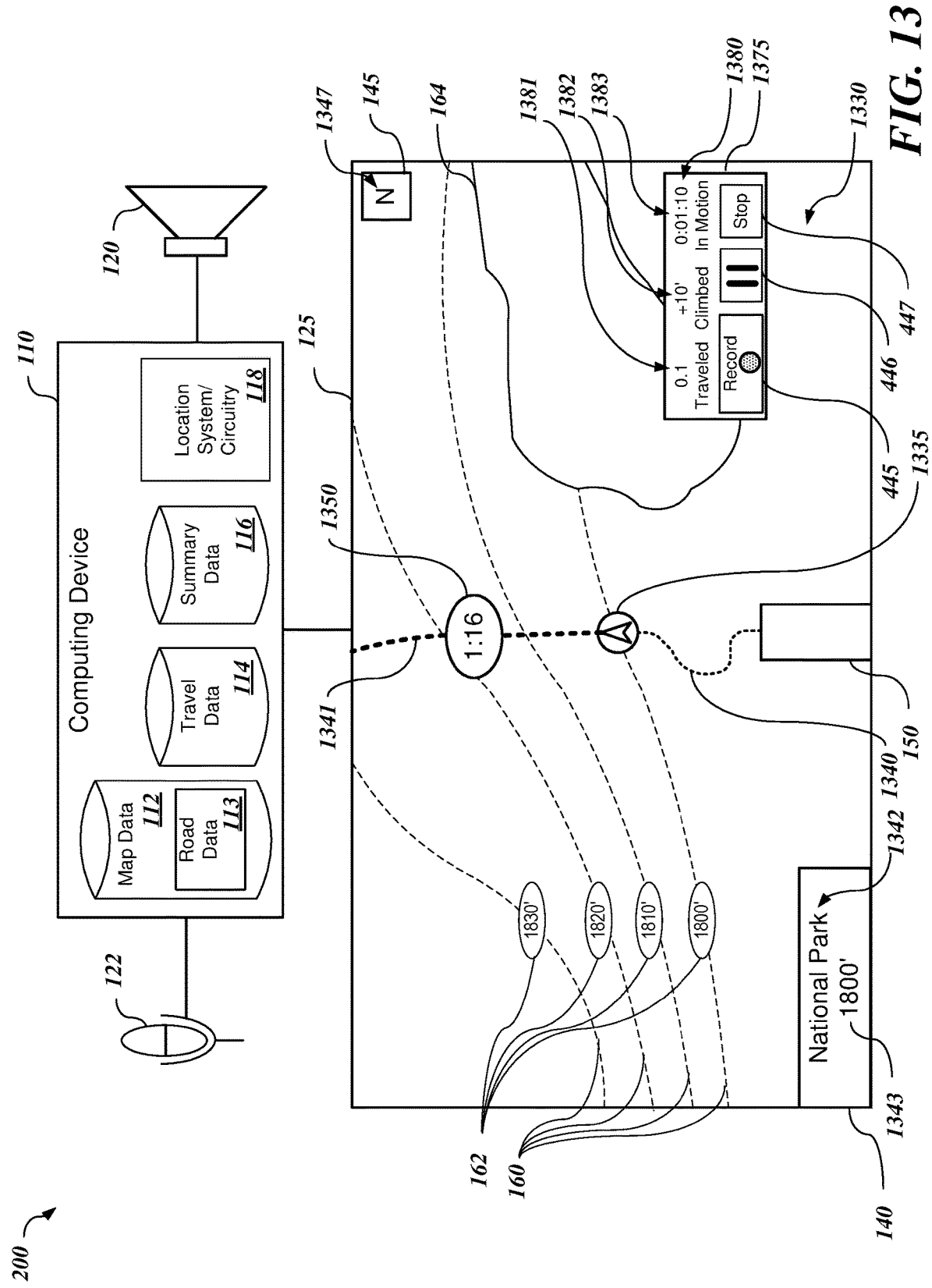

Referring additionally to FIG. 13, in various embodiments upon reaching the destination 1260 (FIG. 12) and proceeding on the route 1070 (FIG. 11), the system 100 presents a location map 1330 like that previously described. The location map 1330 shows the vehicle location 1335. The location map 1330 may also include the location identifier 140 that includes an area name 1342 retrieved from the map data 112 and a current elevation 1343 of the system 100. The orientation indicator 145 indicates the direction of travel 1347. The location map 1330, like the location map 430 of FIG. 4, includes the contour lines 160 and elevation indicators 162 and features such as the lake 164. Also like the location map 430, the location map 1330 shows a route traveled 1340 since leaving the first recognized road 150.

Also like the location map 430, the location map 1330 shows a status window 1375. The status window 1375 shows a distance traveled 1381, an elevation change 1382, and an elapsed time of travel 1383. Also like the status window 475 of the location map 430, the status window 1375 includes a recording toggle 1376, a pause input 1377 to pause the recording of the data and a stop input 1378 to stop the recording of the off-road travel data. However, in the example of FIG. 13, although the off-road travel may be recorded, the recording toggle 1376 is not highlighted, indicating the off-road travel is not currently being recorded.

By contrast to the location map 430, the location map 1330 shows a path 1341 that is part of the selected route 1070 that the user elected to follow. Thus, unlike the location map 430 which shows only the route traveled 440 since leaving the first recognized road 150, the location map 1330 shows the route traveled 1340 since leaving the first recognized road 150 and the path ahead 1341 along the selected route 1070 for the vehicle to follow. The user can manually steer the vehicle to follow the continuing path 1341 or, in a self-driving vehicle, the vehicle itself can follow the continuing path 1341 using the data stored in the travel data 112 as described with reference to FIG. 8. The location map 1330 also may present a remaining time 1350 of travel along the route 1070.

Figure 14:
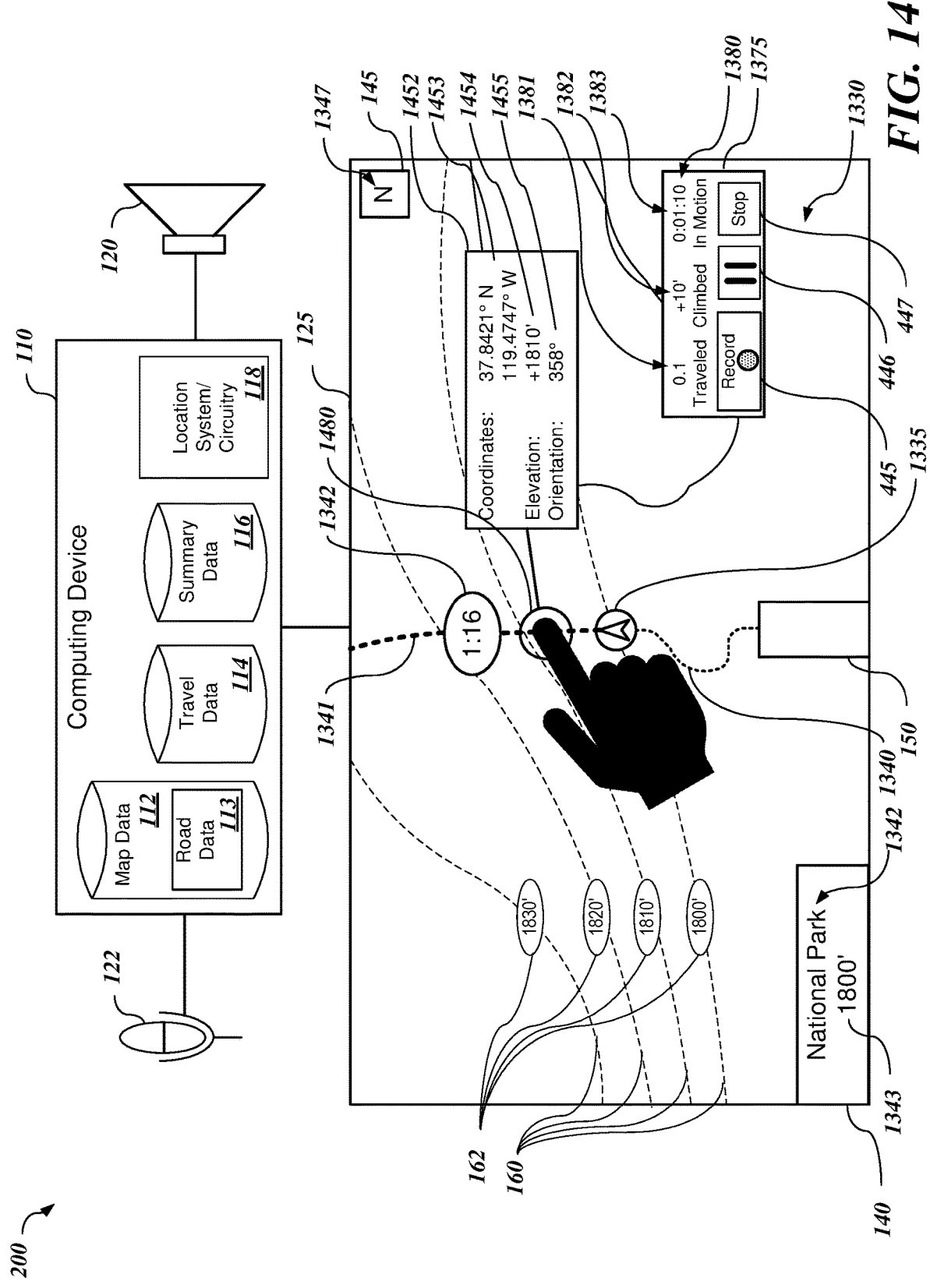

Referring additionally to FIG. 14, in various embodiments the system 100 enables a user to access information about points along the route traveled 1340 and/or the path ahead 1341 along the selected route 1070 (FIG. 11). In various embodiments, by using a digit 190 or another input, a user can select a point 1480 to access an information window 1452 about the point 1480. In various embodiments, the information window includes positional coordinates 1453, an elevation 1454, and an orientation 1455 of the vehicle at the point 1480. Additional information also may be retrievable, for example, if the travel data 112 includes descriptive data for the selected route 1070 or any of the points located on the route 1070.

In various embodiments, the system 100 of FIGS. 1-7 and 8-14 may be integrated into or carried aboard any suitable vehicle as desired. A vehicle may include a car, truck, sport utility vehicle, van, recreational vehicle, marine vessel (such as a boat or a ship), aircraft (such as fixed-wing aircraft, rotary wing aircraft, and lighter-than-air craft), train, motorcycle, or a human-powered vehicle such as a bicycle, tricycle, unicycle, scooter, skateboard, or the like.

Figure 15:
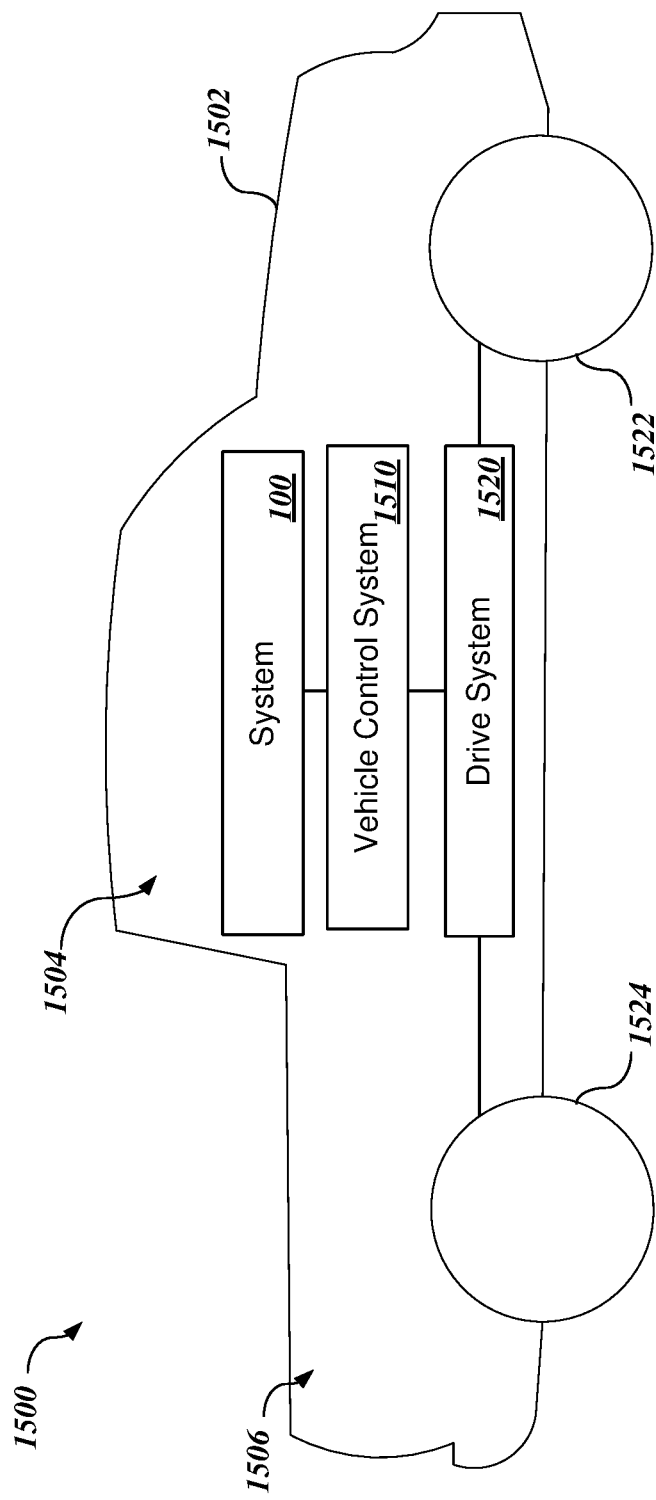
FIG. 15 is a block diagram in partial schematic form of an illustrative vehicle that includes the system of FIGS. 1-14.

Referring additionally to FIG. 15, in various embodiments a vehicle 1500 includes an integrated vehicle control system 1510 that controls operation of the vehicle 1500. In various embodiments, the vehicle control system 1510 may incorporate or interoperate with the system 100. In various embodiments, the system 100 may be a standalone system that is transportable aboard the vehicle 1500 or transportable without a vehicle, such as a smartphone, tablet computer, or other portable computing device.

In various embodiments, the vehicle 1500 includes a body 1502 that may include a cabin 1504 capable of accommodating an operator, one or more passengers, and/or cargo and a cargo area 1506 separate from the cabin 1900, such as a trunk or a truck bed, capable of transporting cargo. When the cabin accommodates one or more occupants, the system 100 may be installed in and/or accessible from the cabin 1504, as further described below with reference to FIG. 18. The vehicle 1500 includes a drive system 1520, as further described below, which is selectively engageable with one or more front wheels 1522 and/or one or more rear wheels 1524 to motivate, accelerate, decelerate, stop, and steer the vehicle 1500.

Referring additionally to FIG. 16, the system 100 may be used with an electrically-powered vehicle 1600. The wheels 1612 and/or 1614 may be motivated by one or more electrically-powered drive systems 1620 and/or 1630, such as motors, operably coupled with the wheels 1612 and/or 1614. The drive systems 1620 and 1630 draw power from a battery system 1610, which also may be used to power the system 100. Referring additionally to FIG. 17, the system 100 may be used with an internal combustion engine-powered vehicle 1700. The wheels 1712 and/or 1714 may be motivated by an internal combustion or hybrid engine 17120 coupled with a fuel tank 1710 via a fuel line 1712. The engine 1720 may be coupled to the wheels 1712 and/or 1714 by mechanical linkages 1730 and 1740, respectively, including axles, transaxles, or other drive train systems to provide rotational force to power the wheels 1712 and/or 1714. It will be appreciated that FIGS. 15-17 show wheeled land vehicles. However, as previously mentioned, it will be appreciated that the system 100 may be integrated with other land vehicles, aircraft, or marine craft.

Figure 18:
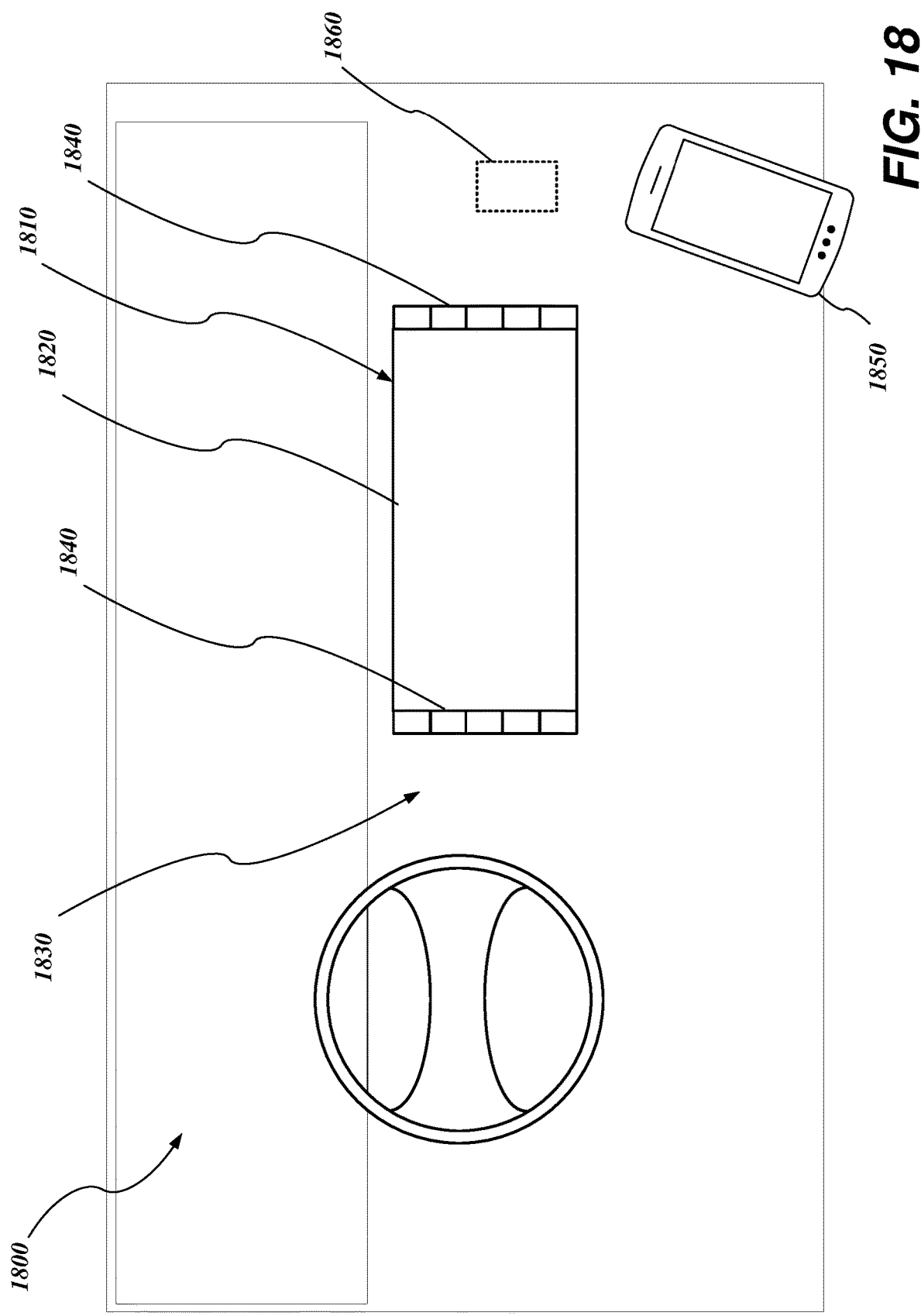
FIG. 18 is a perspective view of a cabin of a vehicle with access to the system of FIGS. 1-14.

Referring additionally to FIG. 18, in various embodiments a cabin 1800 (if provided) of a vehicle, such as cabin 1504 of the vehicle 1500 (FIG. 15) includes an integrated navigation system 1810 that incorporates the system 100 for tracking off-road travel. As previously described, the system 100 may be integrated with or interoperable with the vehicle control system 1510 (FIG. 15). The integrated navigation system may use a display 1820 incorporated in a dashboard or console 1830 within the cabin 1800. The display 1810 may include an interactive display, as previously described with reference to FIG. 1 or a user may engage the system 100 with other input devices 1840 arrayed on the dashboard 1830 or with verbal commands using the audio input interface 122 (FIG. 1). The system 100 also may be supported on a standalone computing device 1850, such as a smartphone, tablet computer, portable computer, smartwatch, or dedicated device. The system 100 may interface with the vehicle control system 1510 via a wired or wireless interface 1860 to enable the standalone computing device 1850 to exchange data with the vehicle control system 1510.

Figure 19:
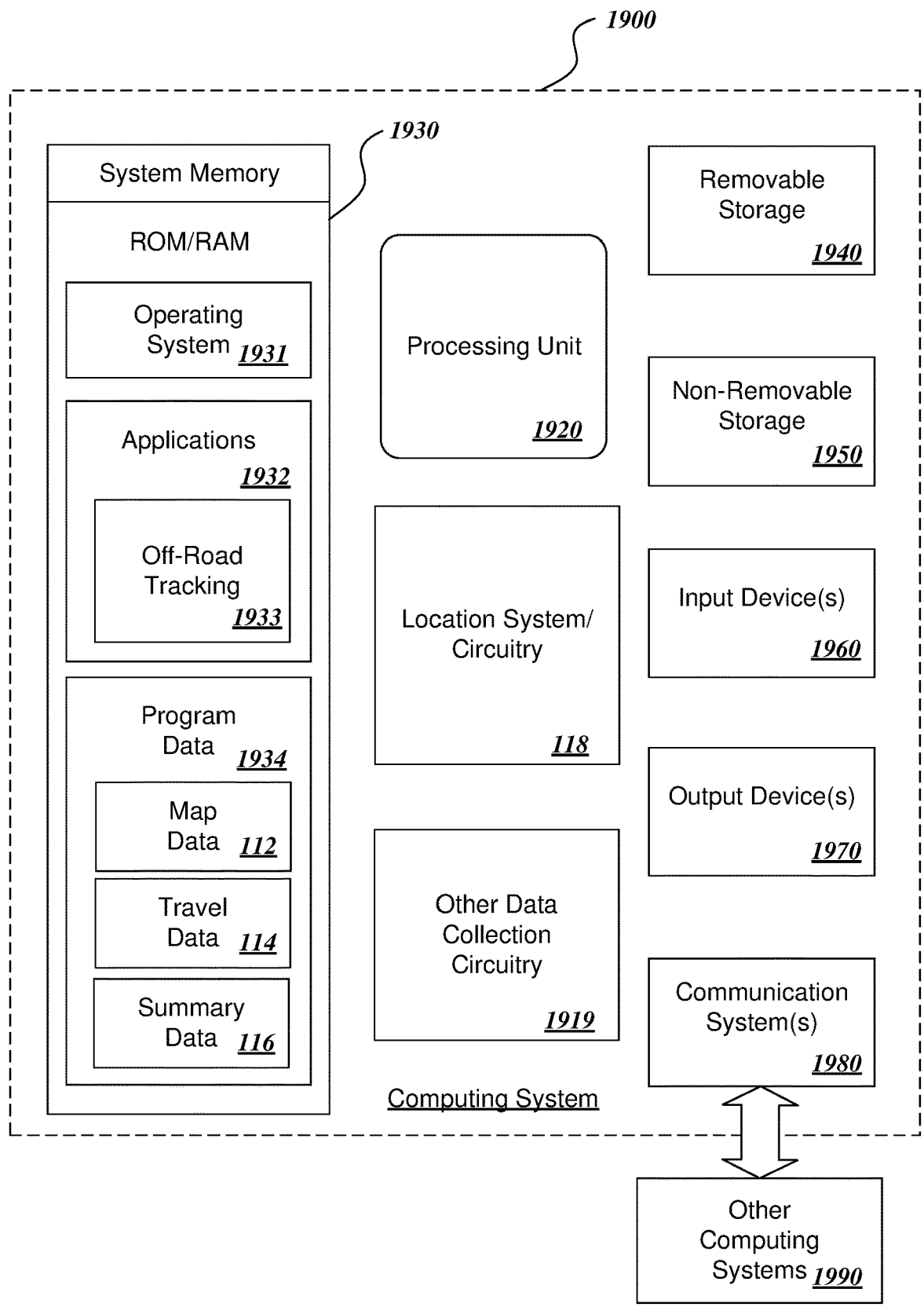
FIG. 19 is a block diagram of an illustrative computing system for performing functions of the system of FIGS. 1-14.

Referring additionally to FIG. 19 and given by way of example only and not of limitation, the computing device 110 of the system 100 (FIG. 1) may include a general purpose computing device 1900 configured to operate according to computer-executable instructions for off-road tracking as previously described. The computing device 1900 typically includes at least one processing unit 1920 and a system memory 1930. Depending on the configuration and type of computing device, the system memory 1930 may include volatile memory, such as random-access memory ("RAM"), non-volatile memory, such as read-only memory ("ROM"), flash memory, and the like, or a combination of volatile memory and non-volatile memory. The system memory 1930 typically maintains an operating system 1931, one or more applications 1932, and program data 1934. The operating system 1931 may include any number of operating systems executable on desktop or portable devices including, but not limited to, Linux, Microsoft Windows®, Apple iOS®, or Android®, or a proprietary operating system. The applications 1932 may include an embodiment of the off-road tracking application 1933 as herein described. The program data 1934 may include the map data 112, travel data 114, and summary data 116, as previously described.

The computing device 1900 may also have additional features or functionality. For example, the computing device 1900 may also include additional data storage devices (removable and/or non-removable) such as, for example, magnetic disks, optical disks, tape, or flash memory. Such additional storage devices are illustrated in FIG. 19 by removable storage 1940 and non-removable storage 1950. Computer storage media may include volatile and non-volatile, removable and non-removable media implemented in any method or technology for storage of information, such as computer-readable instructions, data structures, program modules or other data. The system memory 1930, the removable storage 1940, and the non-removable storage 1950 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic disk storage or other magnetic storage devices, or any other medium which can be used to store the desired information and which can be accessed by the computing device 1900. Any such computer storage media may be part of the computing device 1900.

The computing device 1900 may also have input device(s) 1960 such as a keyboard, stylus, voice input device, touch-screen input device, etc. Output device(s) 1970 such as a display, speakers, short-range transceivers such as a Bluetooth transceiver, etc., may also be included. The computing device 1900 also may include one or more communication systems 1980 that allow the computing device 1900 to communicate with other computing systems 1990, such as those described below with reference to FIG. 20. As previously mentioned, the communication system 1980 may include systems for wired or wireless communications. Available forms of communication media typically carry computer-readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communications media may include wired media such as a wired network or direct-wired connection, and wireless media such as acoustic, radio frequency (RF), infrared and other wireless media. The term computer-readable media as used herein includes both storage media and communication media.

In further reference to FIG. 19, the computing device 1900 may include the location system/circuitry 118, which may include global positioning system ("GPS") and/or geo-location circuitry that can automatically discern its location based on relative positions to multiple GPS satellites or other signal sources, such as cellphone towers or other signal sources. The location system/circuitry 118 may be used to determine a location of the system 100, as previously described. The computing device 1900 also may include other data collection circuitry 1919, such as an altimeter, a compass, and similar circuitry to collect data about the locations through which the system 100 travels, as previously described.

In addition to one or more onboard computing systems, various embodiments may communicate with remote computing systems to perform the functions herein described. Referring to FIG. 20, an operating environment 2000 may include one or more sets of remote computing systems 2020. It will be appreciated that the remote computing system 2020 may include one or more computing systems 2022 that may reside at one or more locations. In various embodiments, the remote computing systems 2020 each may include a server or server farm. The remote computing system 2020 may provide additional sources of off-road travel data in data storage 2030, such as map data 2032, travel data 2034, and summary data 2036. The remote computing system 2020 may access programming and data used to perform their functions or the map data 2032, travel data 2034, and summary data 2036 over high-speed buses 2026 to interact with data storage 2030.

The map data 2032, travel data 2034, and summary data 2036 at the remote computing system 2000 may be accessible to populate, restore, update or augment the map data 112, travel data 114, and summary data 116 (FIG. 1), respectively, stored in the system 100 that, in various embodiments, is integrated with or transportable aboard the vehicle 1500. Data describing new or different routes collected and/or recorded by the system 100 or by other systems 2090 may be added to the travel data 2034 and summary data 2036 to present other off-road routes that may be considered or traveled by other users. In other words, the system 100 may retrieve data describing a route travelled by a user of the system 2090 or vice versa.

In various embodiments, the remote computing systems 2020 communicate with a network 2010 over wired and/or wireless communications links 2013. The systems 100 and 2090 may be integrated with or transportable aboard a vehicle, such as the vehicle 1500. The systems 100 and 2090 may communicate over the network 2010 via communications links 2011 and 2014, respectively, to access the remote computing system 2020 to retrieve or store data from the data storage 2030. The communications links 2011 and 2014 may include wireless communications links to enable mobile communications with the systems 100 and 2090 or may include a wired links to be used, for example, when the vehicle 1500 includes an electric vehicle that is stopped and/or plugged in for charging.

The system 100 also may be supported by a computing system 2070 that is not integrated with or transported aboard the vehicle 2500. The computing system 2070 may include a portable computing system, such as a portable computer, tablet computer, smartphone, or smartwatch and may be used to store or access off-road travel data. The computing system 2070 may communicate over the network 2010 via a communications link 2012 to access the remote computing system 2020 to exchange data with the map data 2032, travel data 2034, and summary data 2036 in the data storage 2030. The communications link 2012 may include a wireless or a wired communications link.

Figure 21:
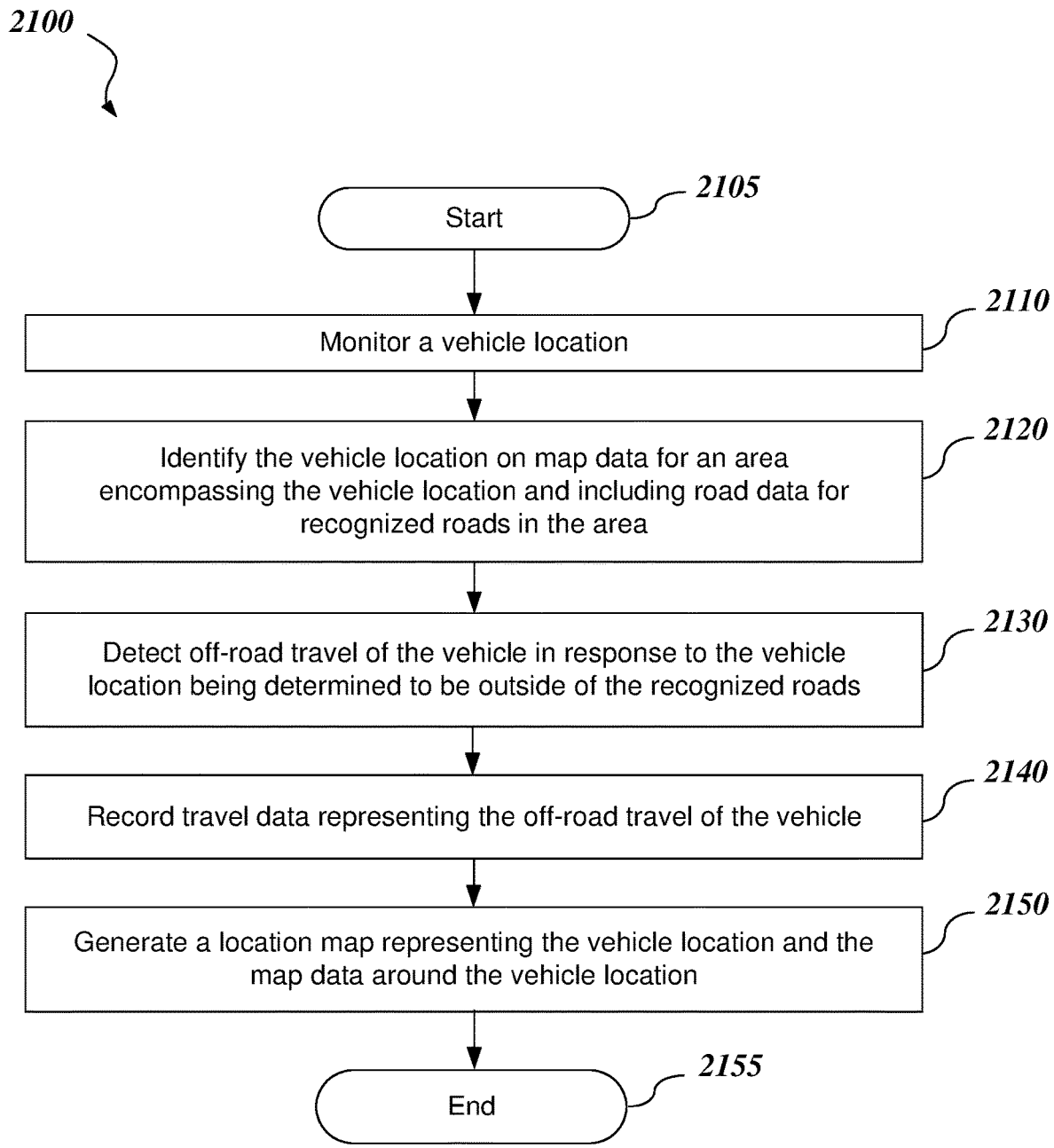
FIG. 21 is a flow chart of an illustrative method for tracking off-road travel.

Referring to FIG. 21, an illustrative method 2100 is provided for tracking off-road travel. The method 2100 starts at a block 2105. At a block 2110, a vehicle location is monitored. At a block 2120, the vehicle location is identified on map data for an area encompassing the vehicle location and including road data for recognized roads in the area. At a block 2130, off-road travel of the vehicle is detected in response to the vehicle location being determined to be outside of the recognized roads. At a block 2140, travel data is recorded representing the off-road travel of the vehicle. At a block 2150, a location map is generated representing the vehicle location and the map data around the vehicle location. The method 2100 ends at a block 2155.

Figure 22:
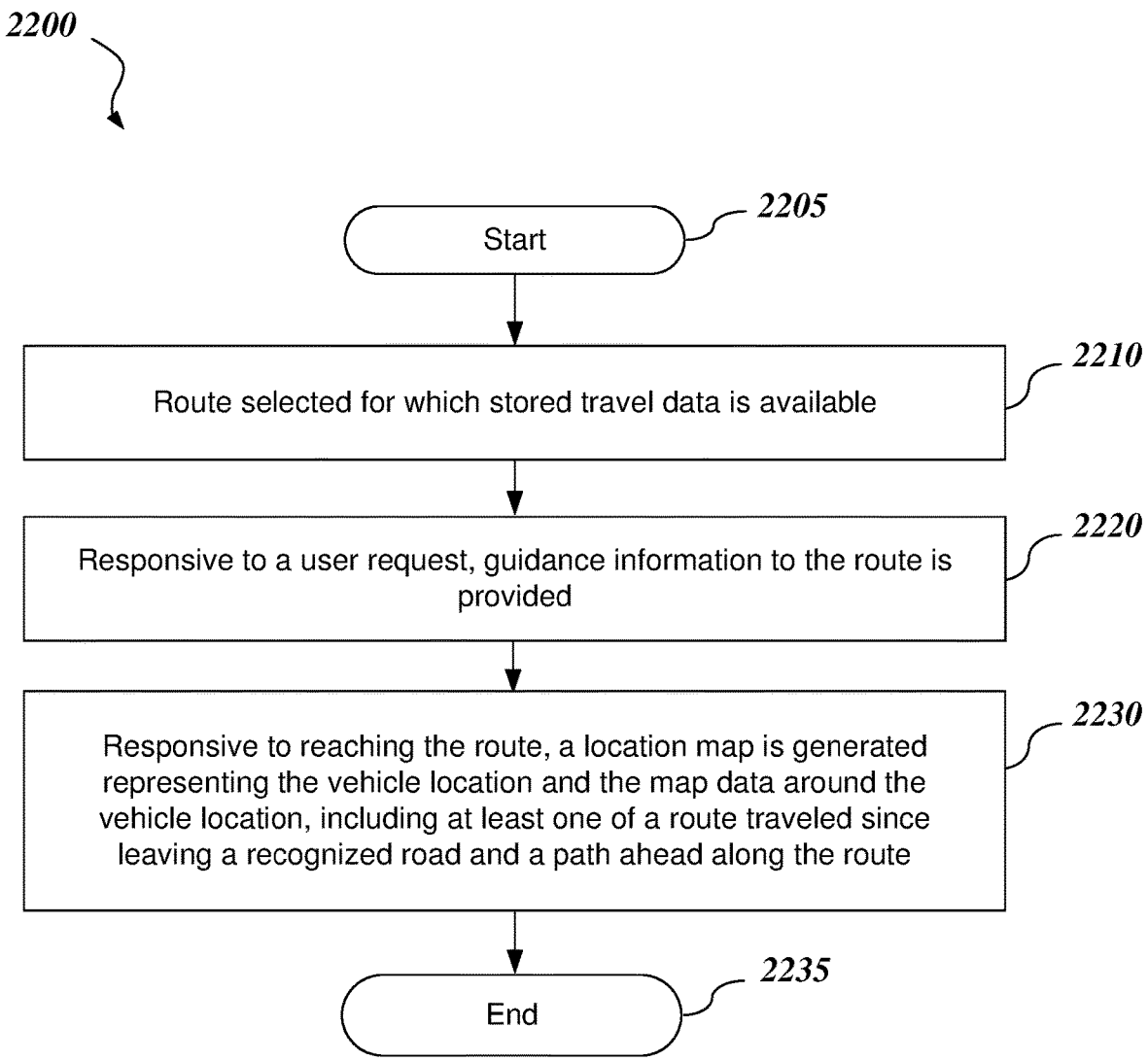
FIG. 22 is a flow chart of an illustrative method for retrieving stored travel data.

Referring to FIG. 22, an illustrative method 2200 is provided for retrieving stored travel data. As previously described with reference to FIGS. 10-14, in various embodiments stored travel data may include routes previously traveled by the user or otherwise made available to the user and guidance along the route and/or to the route may be provided. The method 2200 starts at a block 2205. At a block 2210, a selection is made of a route for which stored travel data is available. As previously described with reference to FIGS. 10 and 11, the user may be presented with information about the route, including a map, details, and summary data about the route. At a block 2220, responsive to a user request, guidance information is provided to the route. The guidance information may be provided to guide a user in directing a vehicle to the route or provided to a self-driving system of the vehicle. At a block 2230, responsive to reaching the route, a location map is generated representing the vehicle location and the map data around the vehicle location, including at least one of a route traveled since leaving a recognized road and a path ahead along the route, as described with reference to FIG. 13. The method 2200 ends at a block 2235

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. A system comprising:
a computing device associated with a vehicle having computer-readable media storing computer-executable instructions configured to cause the computing device to:
monitor a vehicle location;
correlate the vehicle location with map data for an area encompassing the vehicle location and including data for recognized roads in the area;
detect off-road travel of the vehicle in response to determining that the vehicle location is outside of the recognized roads;
upon detecting the off-road travel: (i) update a location identifier displayed on a display from a named road to a named area, and (ii) display a prompt to a user to record travel data representing the off-road travel of the vehicle along a route;
upon receiving an affirmative response to the prompt, record the travel data representing the off-road travel of the vehicle along the route; and
upon determining that the off-road travel has concluded, display the route and portions of the travel data on the display, wherein the display includes an interface having a plurality of selectable points along the route associated with the travel data.

2. The system of claim 1, wherein the travel data further includes data associated with a state of the vehicle at a series of locations included in the off-road travel, wherein each of the data is chosen from positional coordinates, an elevation, a vehicle orientation, a time, and an area name.

3. The system of claim 2, wherein the travel data further includes summary data for the off-road travel chosen from a starting location of the off-road travel, an ending location of the off-road travel, a distance traveled during the off-road travel, a change in elevation from a beginning of the off-road travel to an end of the off-road travel, a date of the off-road travel, a beginning time of the off-road travel, an end time of the off-road travel, and a duration of the off-road travel.

4. The system of claim 3, wherein the computer-executable instructions are further configured to generate a location map representing the vehicle location and the map data around the vehicle location.

5. The system of claim 4, wherein the computer-executable instructions are further configured to, in response to detecting the off-road travel, display a route of the off-road travel of the vehicle after departing from the recognized roads.

6. The system of claim 4, wherein the computer-executable instructions are further configured to include on the location map travel additional information chosen from one of at least a portion of the travel data and at least a portion of the summary data.

7. The system of claim 4, wherein the computer executable instructions are further configured to display the vehicle location at an edge of the location map in response to determining that the vehicle location is within at least one of the recognized roads and to display the vehicle location toward a center of the location map in response to determining that the vehicle location is outside of the recognized roads.

8. The system of claim 1, wherein the computer-executable instructions are further configured to store the travel data for later retrieval and to retrieve the stored travel data.

9. A vehicle comprising:
a cabin;
a drive system;
a location tracking device configured to determine a vehicle location and to generate location data;
a display;
a computing device having computer-readable media storing computer-executable instructions configured to cause the computing device to:
receive and monitor the location data generated by the location tracking device;
correlate the vehicle location with map data for an area encompassing the vehicle location and including data for recognized roads in the area;
detect off-road travel of the vehicle in response to determining that the vehicle location is outside of the recognized roads;
upon detecting the off-road travel: (i) update a location identifier displayed on a display from a named road to a named area, and (ii) display a prompt to a user to record travel data representing the off-road travel of the vehicle along a route;
upon receiving an affirmative response to the prompt, record the travel data representing the off-road travel of the vehicle along the route;
generate a location map representing the vehicle location and the map data around the vehicle location; and
upon determining that the off-road travel has concluded, display the route and portions of the travel data and provide an interface having a plurality of selectable points along the route associated with the travel data.

10. The vehicle of claim 9, wherein the travel data further includes data associated with a state of the vehicle at a series of locations included in the off-road travel, wherein each of the data is chosen from positional coordinates, an elevation, a vehicle orientation, a time, and an area name.

11. The vehicle of claim 10, wherein the travel data further includes at least one set of summary data for the off-road travel chosen from a starting location of the off-road travel, an ending location of the off-road travel, a distance traveled during the off-road travel, a change in elevation from a beginning of the off-road travel to an end of the off-road travel, a date of the off-road travel, a beginning time of the off-road travel, an end time of the off-road travel, and a duration of the off-road travel.

12. The vehicle of claim 11, wherein the computer-executable instructions are further configured to, in response to detecting the off-road travel, display on the location map a route traveled by the vehicle after departing from the recognized roads.

13. The vehicle of claim 12, wherein the computer-executable instructions are further configured to include on the location map travel additional information chosen from one of at least a portion of the travel data and at least a portion of the summary data.

14. The vehicle of claim 9, wherein the computer executable instructions are further configured to display the vehicle location at an edge of the location map in response to determining that the vehicle location is within at least one of the recognized roads and to display the vehicle location toward a center of the location map in response to determining that the vehicle location is outside of the recognized roads.

15. The vehicle of claim 9, wherein the computer-executable instructions are further configured to store the travel data for later retrieval and to retrieve the stored travel data.

16. A computer-implemented method comprising:
monitoring a vehicle location;
correlating the vehicle location with map data for an area encompassing the vehicle location and including data for recognized roads in the area;
detecting off-road travel of the vehicle in response to determining that the vehicle location is outside of the recognized roads;
upon detecting the off-road travel: (i) updating a location identifier displayed on a display from a named road to a named area, and (ii) displaying a prompt to a user to record travel data representing the off-road travel of the vehicle along a route;
upon receiving an affirmative response to the prompt, recording the travel data representing the off-road travel of the vehicle along the route;
generating a location map representing the vehicle location and the map data around the vehicle location; and
upon determining that the off-road travel has concluded, displaying the route and portions of the travel data on the display, wherein the display includes an interface having a plurality of selectable points along the route associated with the travel data.

17. The computer-implemented method of claim 16, wherein the travel data further includes:
data associated with a state of the vehicle at a series of locations included in the off-road travel, wherein the data is chosen from positional coordinates, an elevation, a vehicle orientation, a time, and an area name; and
summary data for the off-road travel chosen from a starting location of the off-road travel, an ending location of the off-road travel, a distance traveled during the off-road travel, a change in elevation from a beginning of the off-road travel to an end of the off-road travel, a date of the off-road travel, a beginning time of the off-road travel, an end time of the off-road travel, and a duration of the off-road travel.

18. The computer-implemented method of claim 17, further comprising responsive to detecting the off-road travel:
displaying on the location map a route traveled by the vehicle after departing from the recognized roads; and
displaying details including at least one detail chosen from one of at least a portion of the travel data and at least a portion of the summary data.

19. The computer-implemented method of claim 16, further comprising retrieving stored travel data select for available off-road trips, wherein the stored travel data is chosen from at least one off-road trip previously taken by the user or at least one made available from another source.

20. The computer-implemented method of claim 19, further comprising responsive to a selection of a route included in one of the available off-road trips, generating additional information chosen from guidance information to a starting point of the route and route information including at least one of a route traveled since leaving a recognized road and a path ahead along the route.

* * * * *